United States Patent
Ka et al.

(10) Patent No.: US 12,478,632 B2
(45) Date of Patent: Nov. 25, 2025

(54) METHOD FOR AMELIORATING PROGRESSION OF RENAL FIBROSIS AND TREATING RENAL FIBROSIS BY 5-(2',4'-DIFLUOROPHENYL)-SALICYLANILIDE DERIVATIVES

(71) Applicant: National Defense Medical University, Taipei (TW)

(72) Inventors: Shuk-Man Ka, Taipei (TW); Hsu-shan Huang, Taipei (TW); Ann Chen, Taipei (TW)

(73) Assignee: NATIONAL DEFENSE MEDICAL UNIVERSITY, Taipei (TW)

( * ) Notice: Subject to any disclaimer, the term of this patent is extended or adjusted under 35 U.S.C. 154(b) by 16 days.

(21) Appl. No.: 18/484,252

(22) Filed: Oct. 10, 2023

(65) Prior Publication Data

US 2024/0033271 A1    Feb. 1, 2024

Related U.S. Application Data

(63) Continuation of application No. 17/308,679, filed on May 5, 2021, now abandoned.

(51) Int. Cl.
*A61K 31/609*    (2006.01)
*A61K 31/536*    (2006.01)
*A61P 13/12*    (2006.01)

(52) U.S. Cl.
CPC .......... *A61K 31/609* (2013.01); *A61K 31/536* (2013.01); *A61P 13/12* (2018.01)

(58) Field of Classification Search
CPC ...... A61K 31/536; A61K 31/609; A61P 13/12
See application file for complete search history.

(56) References Cited

U.S. PATENT DOCUMENTS 9,162,993 B2    10/2015    Chang et al.

OTHER PUBLICATIONS

Yang et al. (Journal of Pathology, 2021; 253: 427-441, published online Jan. 2021 (Year: 2021).*
Hutton et al. (Nephrology 21(2016)736-744) (Year: 2016).*
Shin-Ruen Yang, LCC18, a benzamide-linked small molecule, ameliorates IgA nephropathy in mice, Journal of Pathology, Jan. 27, 2021, J Pathol 2021; 253: 427-441.

* cited by examiner

*Primary Examiner* — Savitha M Rao
(74) *Attorney, Agent, or Firm* — Muncy, Geissler, Olds & Lowe, P.C.

(57) ABSTRACT

The current invention is in the field of molecular biology/pharmacology and provides methods of using a pharmaceutical composition of 5-(2',4'-difluorophenyl)-salicylanilide derivatives and their ring-fused analogs for inhibiting, reducing, or treating chronic kidney disease or/and renal fibrosis, conditions leading to or arising from it, and/or negative effects of each thereof.

9 Claims, 24 Drawing Sheets

METHOD FOR AMELIORATING PROGRESSION OF RENAL FIBROSIS AND TREATING RENAL FIBROSIS BY 5-(2',4'-DIFLUOROPHENYL)-SALICYLANILIDE DERIVATIVES

CROSS-REFERENCE TO RELATED APPLICATION

This application is a continuation application of the U.S. application Ser. No. 17/308,679, filed May 5, 2021, which is herein incorporated by reference in its entirety.

FIELD OF THE INVENTION

The present invention relates to 5-(2',4'-difluorophenyl)-salicylanilide derivatives for ameliorating a renal fibrosis and treating a renal fibrosis.

BACKGROUND OF THE INVENTION

The German clinician, Franz Volhard, and the pathologist, Theodor Fahr, worked closely together in Mannheim from 1909 until 1915 and introduced a novel classification of renal diseases. In their 1914 monograph entitled "Bright's kidney disease. Clinic, Pathology and Atlas" (Die Brightsche Nierenkrankheit. Klinik, Pathologie and Atlas) (Volhard & Fahr, 1914) they differentiated between degenerative (nephroses), inflammatory (nephritides) and arteriosclerotic (scleroses) diseases. Then, the term "nephrosclerosis" ("kidney hardening") was also coined in 1918 by them. The etymology refers to the callous consistence of kidneys cut after removal at autopsy.

Renal fibrosis is the hallmark and the final common pathway of chronic kidney disease (CKD), regardless of underlying etiology. The pathological finding of renal fibrosis is characterized by progressive tissue scarring including glomerulosclerosis, tubulointerstitial fibrosis, and loss of renal parenchyma (including tubular atrophy and dilation, capillary rarefaction, and loss of podocytes). CKD is a major public health issue, afflicting around 14% of the general population and can result in the need for costly dialysis or kidney transplantation. That is to say, renal fibrosis, the common endpoint of almost all progressive kidney diseases and the inevitable outcome of chronic renal injury, is not a simple, uniform scarring, but a dynamic process involving many, if not all, renal and infiltrating cell types.

During the initiating phase, injuries to the tubular epithelial cells and endothelial cells initiate the transformation of the resident fibroblasts and pericytes to myofibroblasts because of their interaction with infiltrating or resident leukocytes. Their interaction with leukocytes may lead to either reversion or perpetuation of the fibrogenesis processes. These factors include those important in cell proliferation, alteration of matrix degradation and turnover, fibrogenesis, contractility, chemotaxis and cell migration, and metabolic changes.

Renal fibrosis is the consequence of excessive accumulation of extracellular matrix and represents a failed wound-healing process of the kidney tissue. The pathogenesis of renal fibrosis is a progressive process that ultimately leads to end-stage renal disease. Several cellular pathways, including activation of fibroblasts and mesangial cells, and epithelial-mesenchymal transition (EMT), have been shown to contribute to excessive deposition of ECM in renal fibrosis. The expression of $\alpha$-SMA, a contractile protein, and overproduction of the interstitial matrix components are the indicators of tubular EMT and the activation of fibroblasts and mesangial cells.

IgA nephropathy (IgAN) is the most common primary glomerulonephritis with severe prognosis, and will see 30-50% of patients developing end stage kidney disease. Lupus nephritis (LN) is the most common secondary glomerular diseases. Further, renal tubulointerstitial lesions (TILs) are also characterized by fibrosis in the kidney are key pathological findings underlying the progression to end-stage renal disease.

For example, renal fibrosis occurs with LN as a repair mechanism; however, it is also a process that is important in the progression of CKD to end-stage renal failure. Thus fibrosis is an important mechanism common to all causes of end-stage renal failure. In CKD, using $\alpha$-SMA as a marker for myofibroblasts, they are seen in the interstitium around the arterioles, glomerular crescents, and mesangium. In LN, podocytes and parietal epithelial cells appear to be transcriptionally reprogrammed to be more mesenchymal-like or pericyte-like to become matrix-forming cells thickening GBM and obliterating the capillary loops. The parietal epithelial cells migrate to the glomerular tuft and later contribute to matrix deposition under conditions that do not favor their differentiation to podocytes. In the interstitium, the major cell types that contribute to fibrosis are pericytes and interstitial resident fibroblasts.

Although a number of potential anti-fibrotic treatments that could specifically target kidney fibrosis, no therapeutic tools have been yet developed in order to counteract the development of kidney fibrosis. That is to say there remains a translational barrier from the identification of the promising antifibrotic therapeutic drug target to the transformation of this knowledge into clinical application for human health.

However, despite all efforts, there is still an urgent need for a better understanding of consequently novel therapies.

SUMMARY OF THE INVENTION

An object of the invention is to provide derivatives for relieving progression of chronic kidney disease, especially ameliorating a renal fibrosis and treating a renal fibrosis.

Another aspect of the present invention provides the derivatives include, but are not limited to, 6-(2,4-difluorophenyl)-3-(3-(trifluoromethyl)phenyl)-2H-benzo[e][1,3]oxazine-2,4(3H)-dione for use in treating chronic kidney disease in subjects such as those with IgA nephropathy, lupus nephritis, or renal tubulointerstitial lesions.

In summary, these and other objects have been achieved according to the present disclosure which demonstrates the 6-(2,4-difluorophenyl)-3-(3-(trifluoromethyl)phenyl)-2H-benzo[e][1,3]oxazine-2,4(3H)-dione attenuatimg glomerular cell proliferation, attenuating sclerosis and fibrosis, attenuating crescent formation in a kidney of the CKDs' subject.

Detailed description of the invention is given in the following embodiments with reference to the accompanying drawings.

BRIEF DESCRIPTION OF THE DRAWINGS

The foregoing summary, as well as the following detailed description of the invention, will be better understood when read in conjunction with the appended drawings.

FIG. 1A-1C, 1G, 1H demonstrate P-IgAN mouse model. FIG. 1D-1F, 1J, 1K, 1L demonstrate S-IgAN mouse model. FIG. 1A and FIG. 1D represent Serum levels of BUN. FIGS. 1B and 1E represent Serum levels of Cr. FIGS. 1C and 1F represent Urine albumin/Cr. FIGS. 1G and 1J represent H&E staining. FIG. 1H, 1K, 1L represent Scoring of H&E staining. Scale bars=50 µm. Original magnification ×400. Data are shown as the mean±SD of 7 mice per group. P-WT+Saline, C57BL/6 mice injected with saline only; P-IgAN+Vehicle, passively induced IgAN mice treated with vehicle (PEG 400) only; P-IgAN+LCC18, passively induced IgAN mice treated with LCC18; S-WT, age-matched BALB/c mice; S-IgAN+Vehicle, spontaneous IgAN in gddY mice (S-IgAN) treated with vehicle only; S-IgAN+LCC18, spontaneous IgAN mice treated with LCC18; BUN, blood urea nitrogen; Cr, creatinine. *$p<0.05$, $p<0.01$, *$p<0.005$, ****$p<0.001$. #Not detectable. ns, no significant difference. Data of FIG. 1A-1B, 1D-1E, 1H, 1K, 1L were analyzed using ANOVA (with Dunnett's multiple comparisons test). Data of FIG. 1C, 1F were analyzed using t-tests (two-tailed).

FIG. 2A demonstrate P-IgAN mouse model. FIG. 2B demonstrate S-IgAN mouse model. FIG. 2A and FIG. 2B represent Renal levels of ROS. Data are shown as the mean±SD of 7 mice per group. P-WT+Saline, age-matched C57BL/6 mice injected with saline only; P-IgAN+Vehicle, passively induced IgAN mice treated with vehicle (PEG 400) only; P-IgAN+LCC18, passively induced IgAN mice treated with LCC18; S-WT, age-matched BALB/c mice; S-IgAN+Vehicle, spontaneous IgAN in gddY mice (S-IgAN) treated with vehicle only; S-IgAN+LCC18, spontaneous IgAN mice treated with LCC18. *$p<0.05$, $p<0.01$, *$p<0.005$, ****$p<0.001$. ns, no significant difference. Data of FIG. 2A-2B were analyzed using ANOVA (with Dunnett's multiple comparisons test).

(FIG. 6M) T cell proliferation analysis from splenocytes by using [$H^3$]-thymidine incorporation assay. Data are presented as means±SEM with seven mice per group. ASLN, accelerated, severe lupus nephritis. *$p<0.05$, $p<0.01$, *$p<0.005$, ****$p<0.001$. #Not detectable. ns, no significant difference. Data of FIG. 5A-5D were analyzed using ANOVA (with Dunnett's multiple comparisons test).

DETAILED DESCRIPTION OF THE INVENTION

Figure 1A:
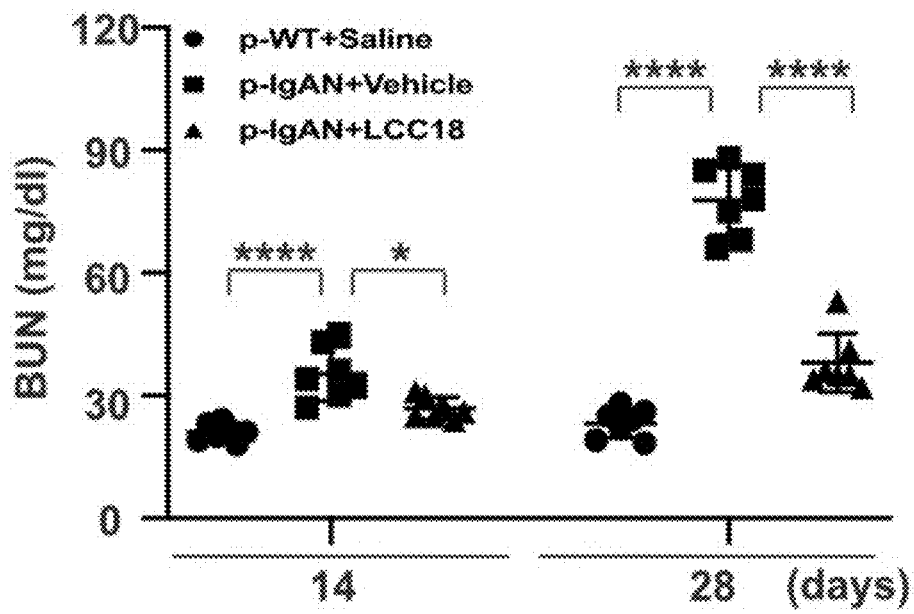
FIG. 1A-1L depict clinical assessments and renal pathology in IgAN mice.

While preferred embodiments of the invention are shown and described herein, such embodiments are provided by way of example only and are not intended to otherwise limit the scope of the invention. Various alternatives to the described embodiments of the invention may be employed in practicing the invention.

Unless otherwise defined, all technical terms used herein have the same meaning as commonly understood by one of ordinary skill in the art to which this invention belongs.

The present invention provides a method for treating, or alleviating a symptom of CKD or/and renal fibrosis by administering to the subject a pharmaceutical composition, or a pharmaceutically acceptable salt, prodrug, metabolite, solvate, and polymorph thereof, optionally in a therapeutically effective amount.

Optionally, in an exemplary embodiment of the present invention, the pharmaceutical composition of the present invention includes, but are not limited to, 5-(2',4'-difluorophenyl)-salicylanilide derivatives and their ring-fused analogs.

Furthermore, the 5-(2',4'-difluorophenyl)-salicylanilide derivatives include, but are not limited to, 6-(2,4-difluorophenyl)-3-(3-(trifluoromethyl)phenyl)-2H-benzo[e][1,3]oxazine-2,4(3 H)-dione.

In one embodiment, 6-(2,4-difluorophenyl)-3-(3-(trifluoromethyl)phenyl)-2H-benzo[e][1,3]oxazine-2,4(3H)-dione is defined as LCC18.

A subject (patient) may be a human being or a non-human animal, such as cat, dog, rabbit, cattle, horse, sheep, goat, monkey, mouse, rat, gerbil, guinea pig, pig, but is preferably a human. Usually, the individual has suffered or is in risk of developing CKD that results in some degree of kidney function loss and/or has a condition that will result in CKD. Preferably, the subject has suffered or is in risk of developing a CKD (such as a subject having diseases and conditions that can damage the kidneys). Diseases and conditions that can damage the kidneys and lead to CKD include, but are not limited to, autoimmune disorders (such as systemic lupus erythematosus).

In addition, the pharmaceutical composition of the present invention can relieve progression of CKD of the subject. The CKDs include, but are not limited to, glomerulonephritis, and renal fibrosis.

For example, in some embodiments, the glomerulonephritis in the present invention include, but not limited to, primary glomerulonephritis and secondary glomerulonephritis.

On the other side, the primary glomerulonephritis in the present invention includes, but not limited to, IgA nephropathy. Furthermore, the secondary glomerulonephritis in the present invention includes, but not limited to, lupus nephritis. Moreover, the glomerulonephritis in the present invention includes, but not limited to, renal tubulointerstitial lesions.

The pharmaceutical composition of the present invention may be administered prior to, concurrently, or after the onset of physical or histological symptoms of CKD, such as the time of renal tissue injury, or the establishment of tubulointerstitial fibrosis.

As used herein, the term "treating" or "treatment" can refer to one or more of (1) inhibiting the disease; for example, inhibiting a disease, condition or disorder in an individual who is experiencing or displaying the pathology or symptomatology of the disease, condition or disorder (i.e., arresting further development of the pathology and/or symptomatology); and (2) ameliorating the disease; for example, ameliorating a disease, condition or disorder in an individual who is experiencing or displaying the pathology or symptomatology of the disease, condition or disorder (i.e., reversing the pathology and/or symptomatology) such as decreasing the severity of disease.

The "therapeutic effective amount" used herein refers to that amount of the therapeutic agent sufficient to result in amelioration of one or more symptoms of the disorder, or prevent advancement of the disorder, or cause regression of the disorder without undesirable side effects, such as toxicity, irritation or allergic response. Although individual needs may vary, the determination of optimal ranges for effective amounts of formulations is within the skill of the art. Human doses can readily be extrapolated from animal studies (Katocs et al., Chapter 27 In: Remington's Pharmaceutical Sciences, 18th Ed., Gennaro, ed., Mack Publishing Co., Easton, Pa., 1990).

The term "therapeutically effective amount", as used herein, refers to an amount of a pharmaceutical agent to treat, ameliorate, or prevent an identified disease or condition, or to exhibit a detectable therapeutic or inhibitory effect. The effect can be detected by any assay method known in the art. The precise effective amount for a subject will depend upon the subject's body weight, size, and health; the nature and extent of the condition; and the therapeutic or combination of therapeutics selected for administration. Therapeutically effective amounts for a given situation can be determined by routine experimentation that is within the skill and judgment of the clinician. In a preferred aspect, the disease or condition to be treated is a chronic kidney disease, including chronic kidney disease in Stage 1, 2, 3, 4, and 5.

For example, with respect to the treatment of CKD or/and renal fibrosis, a therapeutically effective amount means an amount effective to treat CKD or/and renal fibrosis, which is an amount effective to reverse, halt, or delay the progress of CKD or/and renal fibrosis, or to confer protection of kidney from subsequent damage.

In one embodiment, a therapeutically effective amount will refer to the amount of a therapeutic agent that decreases the amount of deposition of extracellular matrix in the obstructed kidney by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100%. The detection of an alteration can be carried out in vitro e.g., using a biological sample or in vivo. A biological sample may be any tissue or fluid from a subject that is suitable for detecting the deposition of extracellular matrix. In one embodiment, the biological sample could be evaluated by a non-invasively detecting kit comprising RussiaSea-001 (*Crenomytilus grayanus* lectin/CGL) or RussiaSea-002 (*Mytilus trossulus* lectin/MTL).

In a further embodiment, a therapeutically effective amount will refer to the amount of a therapeutic agent that improves a patient's kidney function by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100%. Kidney function may be assessed by any method known in the art, such as by measuring blood Creatinine levels, Creatinine clearance, or urine Creatinine levels.

Generally, the dosage required to provide an effective amount of a formulation, which can be adjusted by one skilled in the art, will vary depending on several factors, including the age, health, physical condition, weight, type and extent of the disease or disorder of the recipient, frequency of treatment, the nature of concurrent therapy, if required, and the nature and scope of the desired effect(s) (Nies et al., Chapter 3 In: Goodman & Gilman's The Pharmacological Basis of Therapeutics, 9th Ed., Hardman et al., eds., McGraw-Hill, New York, N.Y., 1996).

A "pharmaceutical composition" is a formulation containing the compounds of the present invention in a form suitable for administration to a subject. In one embodiment, the pharmaceutical composition is in bulk or in unit dosage form. The dosage will depend on the route of administration via depending on the age and condition of the subject. A variety of routes are contemplated, including oral, pulmonary, rectal, parenteral, transdermal, subcutaneous, intravenous, intramuscular, intraperitoneal, inhalational, buccal, sublingual, intrapleural, intrathecal, intranasal, and the like. Dosage forms for the topical or transdermal administration of a compound of this invention include powders, sprays, ointments, pastes, creams, lotions, gels, solutions, patches and inhalants. In one embodiment, the active compound is mixed under sterile conditions with a pharmaceutically acceptable carrier, and with any preservatives, buffers, or propellants that are required.

Dosage and administration are adjusted to provide sufficient levels of the active agent(s) or to maintain the desired effect. Factors which may be taken into account include the severity of the disease state, general health of the subject, age, weight, and gender of the subject, diet, time and frequency of administration, drug combination(s), reaction sensitivities, and tolerance/response to therapy. Long-acting pharmaceutical compositions may be administered every day, every 2 days, every 3 to 4 days, every week, or once every two weeks depending on half-life and clearance rate of the particular formulation.

For example, in some embodiments, the pharmaceutical composition of the present disclosure is administered once per month, twice per month, three times per month, every other week, once per week, twice per week, three times per week, four times per week, five times per week, six times per week, every other day, daily, twice a day, or three times a day.

Whilst the dosage of the pharmaceutical composition used will vary according to the activity and the condition being treated, it may be stated by way of guidance that a dosage selected in the range from 5 to 30 mg/kg per body weight per dose, particularly in the range from 10 to 20 mg/kg of body weight per dose.

EXAMPLES

The embodiments encompassed herein are now described with reference to the following examples. These examples are provided for the purpose of illustration only and the disclosure encompassed herein should in no way be construed as being limited to these examples, but rather should be construed to encompass any and all variations which become evident as a result of the teachings provided herein.

Example 1

LCC18 Improves Renal Function, Albuminuria and Renal Pathology in IgAN Animal Models Two complementary mouse models of IgAN—a passive IgAN (P-IgAN) and a spontaneous IgAN in gddY mice (S-IgAN) were used to examine therapeutic effects of LCC18 on renal conditions of IgAN. In other word, two complementary IgAN mouse models included: (1) a passively induced IgAN (P-IgAN) model, characterized by mesangial cell proliferation in glomeruli. Eight-week-old female C57BL/6 mice were injected with IgA anti-PC intraperitoneally and PnC intravenously for 14 or 28 consecutive days. Treatment with LCC18 (daily dose of 10 mg/kg body weight) dissolved in polyethylene glycol 400 (PEG 400) (Sigma-Aldrich, St. Louis, MO, USA) via an intraperitoneal (IP) route (P-IgAN+LCC18), and another group of IgAN mice was administered vehicle only (PEG 400) as the disease control group (P-IgAN+Vehicle). Mice were killed at days 14 and 28. Age-matched C57BL/6 mice injected with saline (P-WT+Saline) were used as normal controls; (2) a spontaneous IgAN in gddY (S-IgAN) mice, featuring severe glomerular and tubulointerstitial lesions, characterized by mesangial proliferation, and mesangial matrix expansion. LCC18 (S-IgAN+LCC18) or vehicle (S-IgAN+Vehicle) was administered to mice daily beginning at 8 weeks of age and continuing throughout the present invention. The gddY mice were sacrificed at 32 weeks. Age-matched BALB/c mice served as normal controls (S-WT). All animal experiments were conducted with approval of the Institutional Animal Care and Use Committee of the National Defense Medical Center, Taipei, Taiwan, and were conducted in accordance with NIH Guidelines for the Care and Use of Laboratory Animals.

Figure 1B:
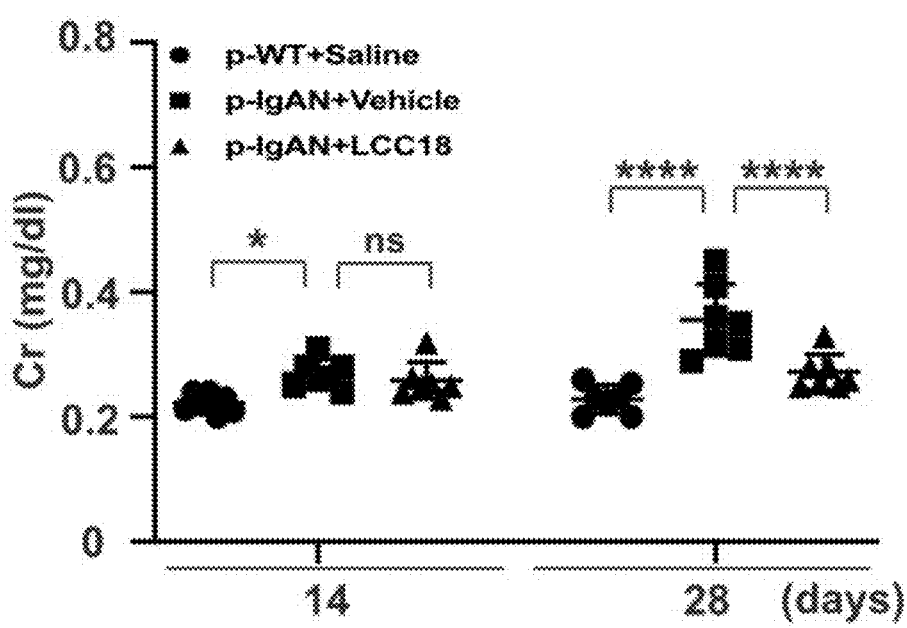
Figure 1C:
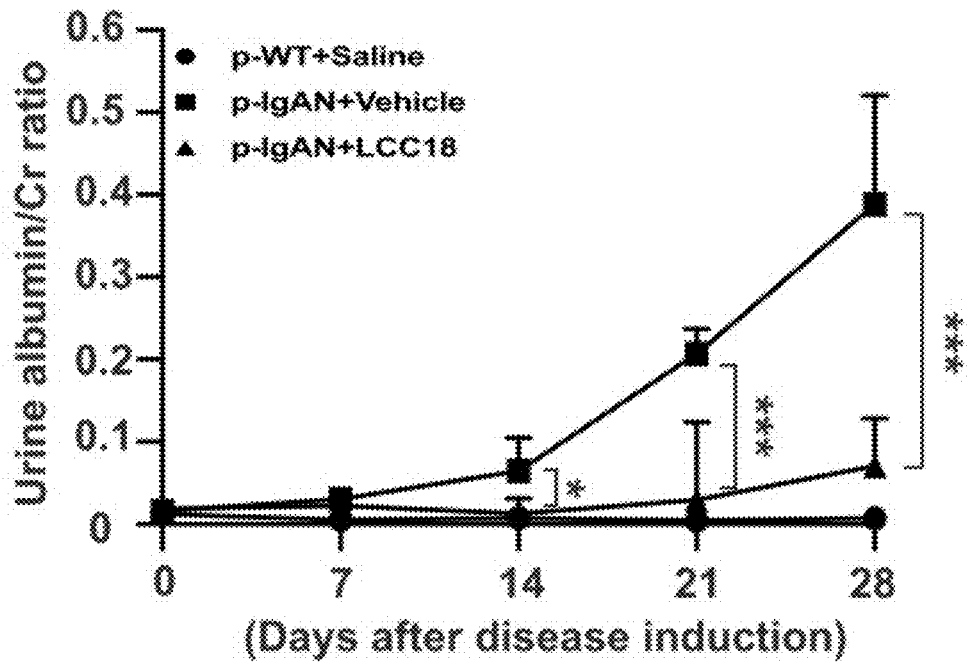
Figure 1D:
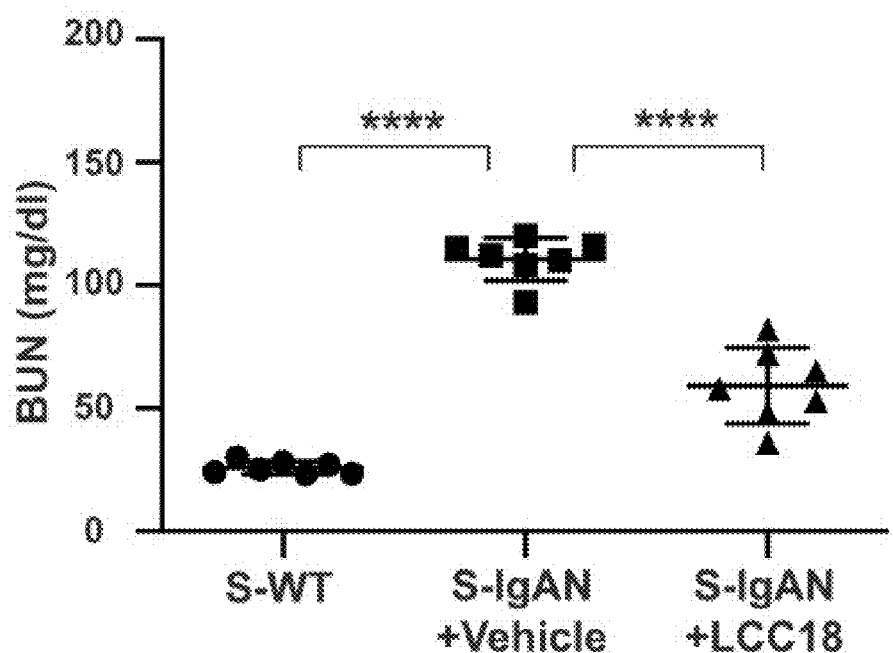
Figure 1E:
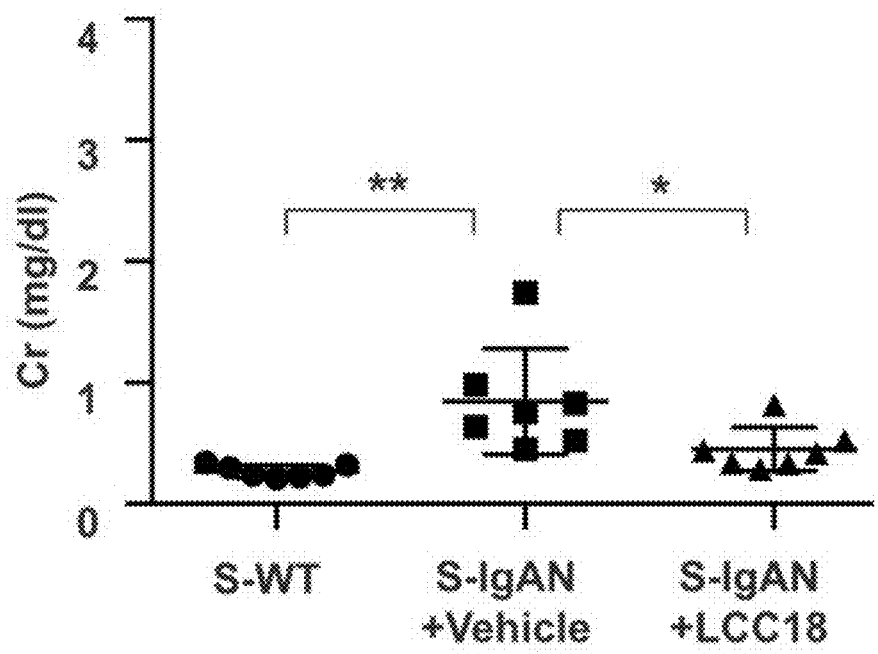
Figure 1F:
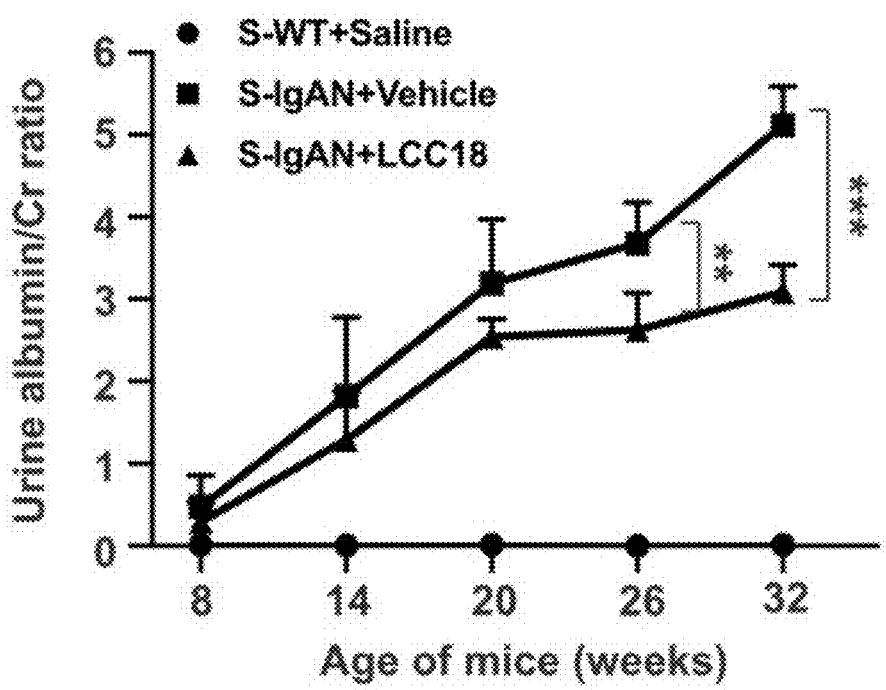

For the P-IgAN model, the mice received daily at day 7 after disease induction, either LCC18 (10 mg/kg body weight) (P-IgAN+LCC18) or vehicle (P-IgAN+Vehicle) via IP throughout the study. For the S-IgAN model, LCC18 (S-IgAN+LCC18) or vehicle (S-IgAN+Vehicle) was administered to the mice daily throughout the study via IP, beginning at 8 weeks of age. Significantly lower serum levels of BUN and Cr were recorded (FIG. 1A, FIG. 1B) in P-IgAN+LCC18 mice than in P-IgAN mice treated with vehicle (P-IgAN+Vehicle mice), which showed increased levels of these parameters for renal function compared to those of C57BL/6 mice, wild type for P-IgAN, injected with saline (P-WT+Saline mice). In addition, S-IgAN+LCC18 mice also benefited from treatment with the LCC18 (FIG. 1D, FIG. 1E). In parallel, significantly decreased urine levels of albumin, demonstrated by the urine albumin/Cr ratio, were observed in P-IgAN+LCC18 mice compared to P-IgAN+Vehicle mice. This beneficial effect began on day 21 after disease induction and increased until day 28 when mice were sacrificed (FIG. 1C). This therapeutic effect was also observed in S-IgAN+LCC18 mice beginning on week 24 and with vehicle treatment beginning on week 8, continuing to week 32 during LCC18 treatment (FIG. 1F).

Figure 1G:
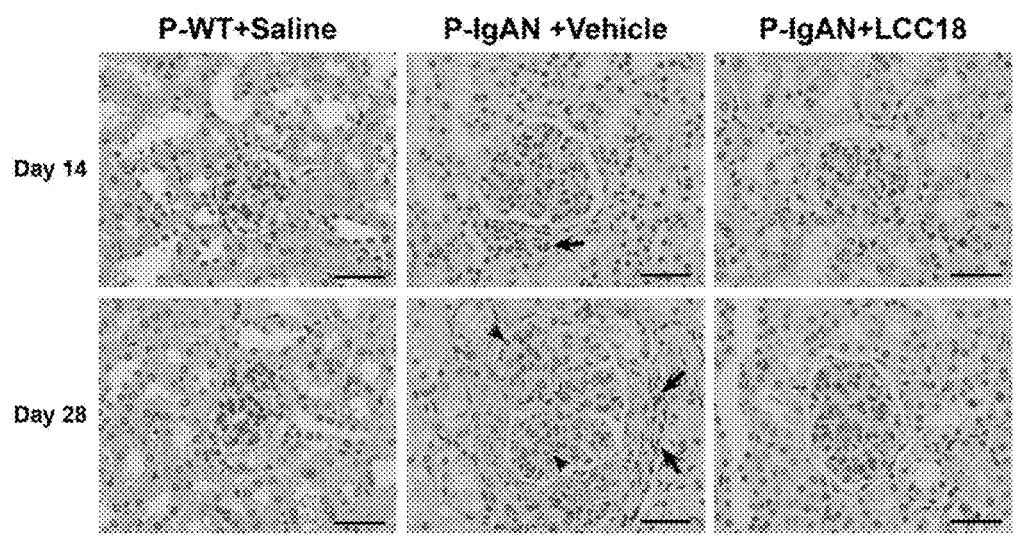
Figure 1H:
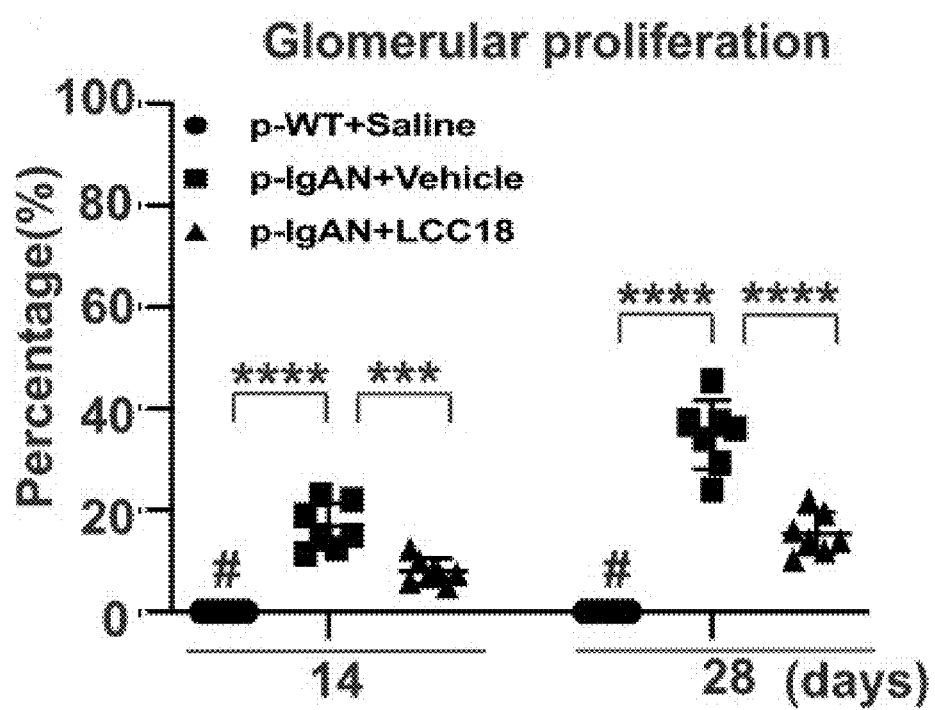
Figure 1I:
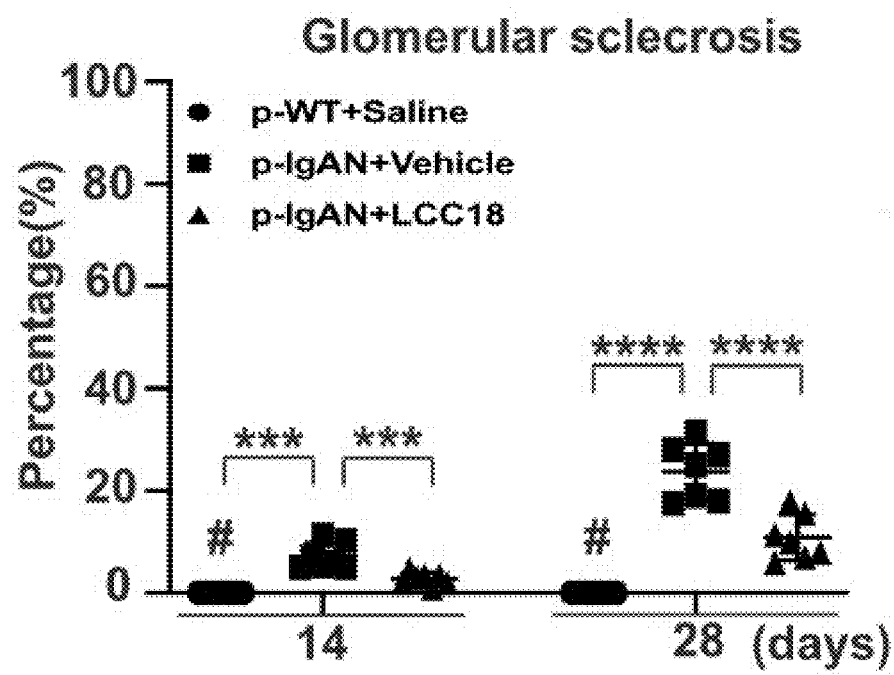
Figure 1J:
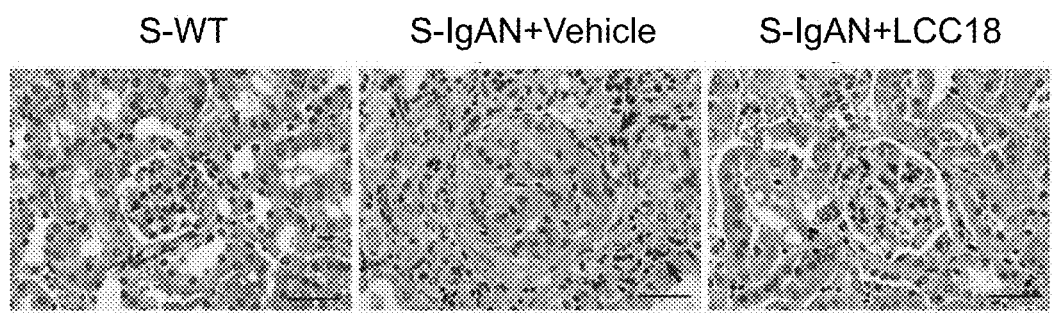
Figure 1K:
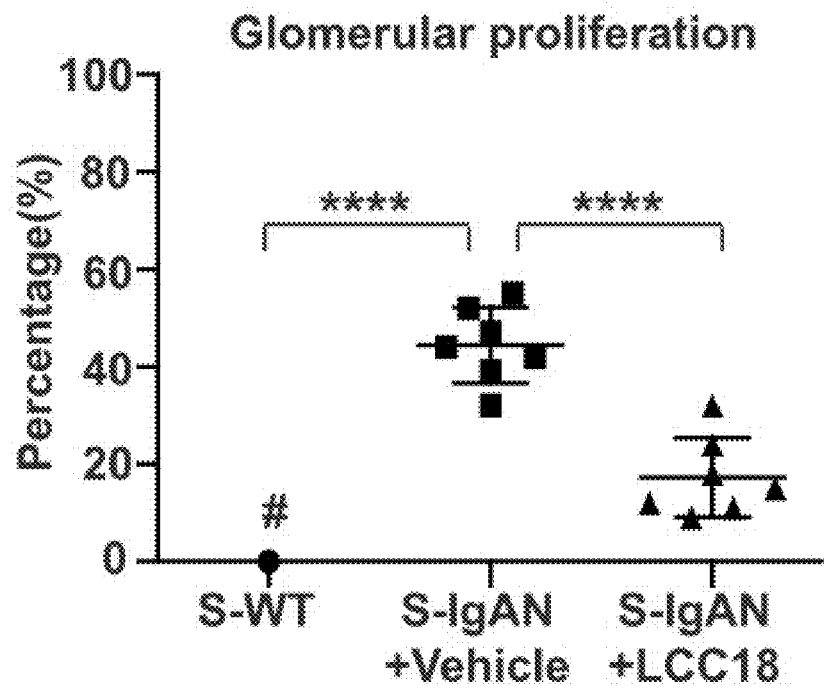
Figure 1L:
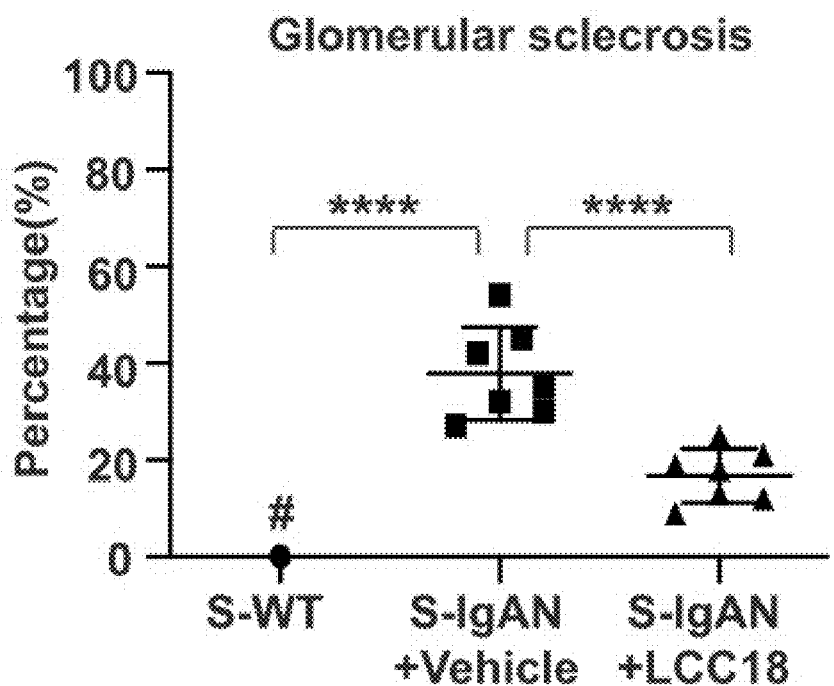

By light microscopy, although glomerular cell proliferation, and sclerosis in glomeruli were observed in P-IgAN+Vehicle mice, the severity of renal lesions was markedly reduced in P-IgAN+LCC18 mice (FIG. 1G, FIG. 1H, FIG. 1I). In S-IgAN+LCC18 mice, similar renal lesion improvement was noted (FIG. 1K, FIG. 1L).

Example 2

LCC18 Reduces ROS Level in IgAN Mice

Figure 2A:
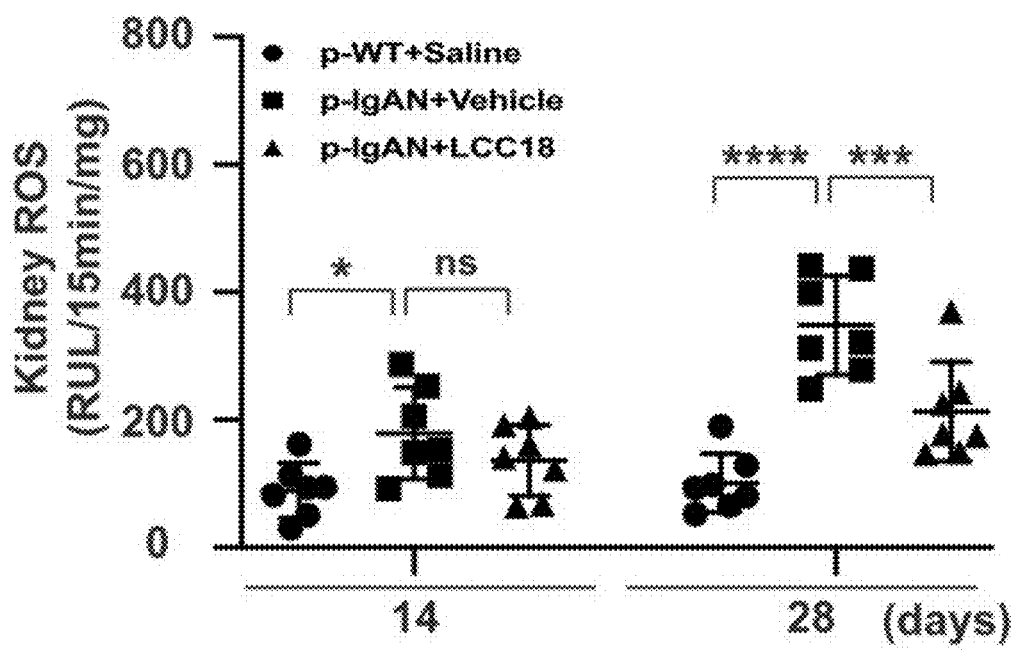
FIG. 2A-2B depict reduces ROS level in IgAN mice and inhibition in IgAN mice via administrated LCC18.
Figure 2B:
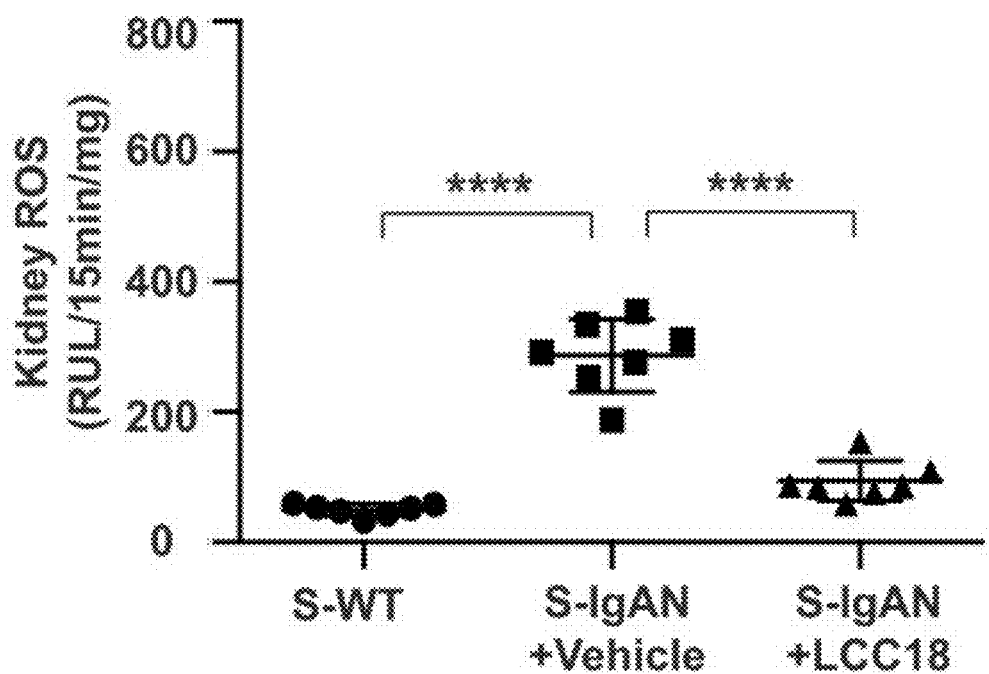

Significantly reduced ROS levels in renal tissues were recorded in P-IgAN+LCC18 and S-IgAN+LCC18 mice compared to P-IgAN+Vehicle and S-IgAN+Vehicle mice (FIG. 2A and FIG. 2B).

Example 3

LCC18 Inhibits Dendritic Cells (DCs) and T Cell Functions in IgAN Mice

Figure 3A:
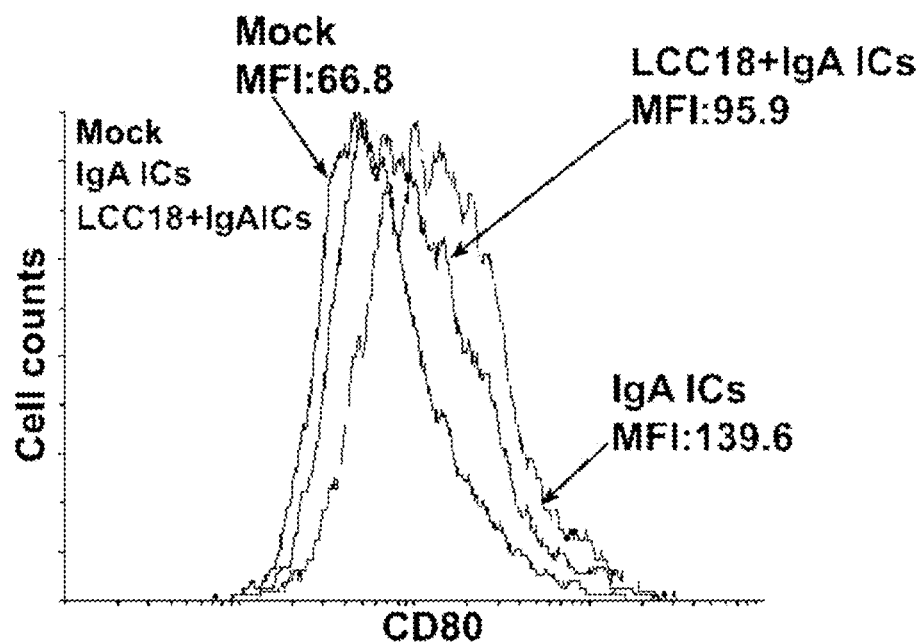
FIG. 3A-3H depict that LCC18 inhibits activation of DCs and systemic immune responses in IgAN model. The fluorescence intensity of $CD80^+$ in gated $CD11c^+$ cells (within gated $CD11c^+$ cells, grey-filled area created by staining with an isotype-matched control antibody) determined by flow cytometry (FIG. 3A). T-cell proliferation measured by [$^3$H] thymidine (FIG. 3B). BMDCs were incubated for 24 h with IgA ICs and co-cultured with OT-II $CD^I$ T cells pulsed with OVA peptide. P-IgAN mouse model (FIG. 3C, FIG. 3D, FIG. 3E). S-IgAN mouse model (FIG. 3F, FIG. 3G, FIG. 3H). CD3 T-cell proliferation in splenocytes by [$^3$H]thymidine uptake (FIG. 3C and FIG. 3F). Numbers of $CD4^+CD44^{hi}CD62L^{lo}$ (FIG. 3D and FIG. 3G) and $CD8^+CD44^{hi}CD62L^{lo-hi}$ (FIG. 3E and FIG. 3H) memory T cells among splenic cells assessed by flow cytometry. WT, wild type. #Not detectable. BMDCs, bone marrow-derived dendritic cells. Bars show the mean±SD of 7 mice per group. *$p<0.05$, $p<0.01$, *$p<0.005$, ****$p<0.001$. ns, no significant difference. Data of FIG. 3B-FIG. 3H were analyzed using ANOVA (with Dunnett's multiple comparisons test).
Figure 3B:
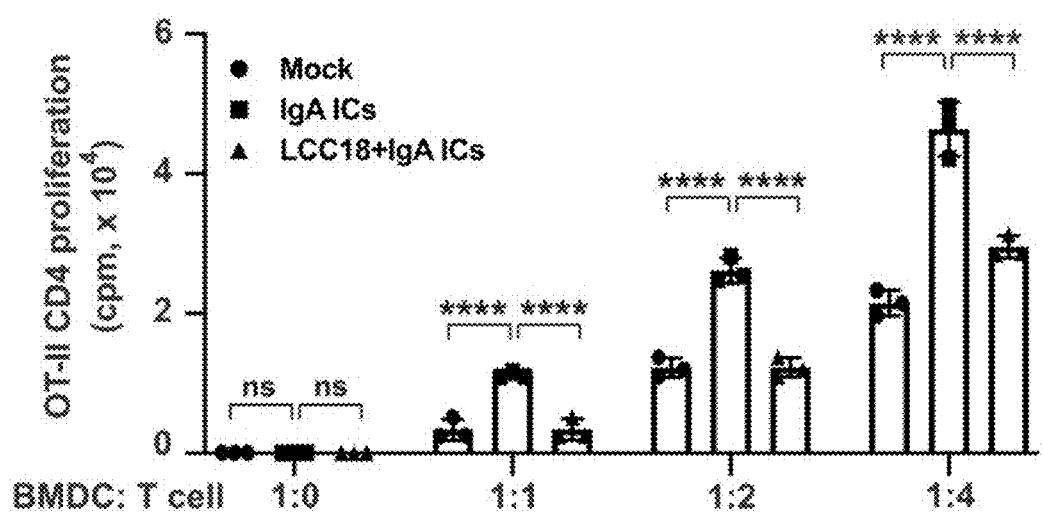

Significantly decreased fluorescence intensity levels of $CD11c^+CD80^+$ (an activation marker for DCs) cells (FIG. 3A) were seen in LCC18-treated IgA immune complexes (IgA ICs)-stimulated, bone marrow-derived DCs (BMDCs), compared with normal controls (mock). Using an OVA-specific T cell proliferation assay, IgA ICs-stimulated BMDCs induced markedly increased $CD4^+$ T cell proliferation (FIG. 3B), but these effects were inhibited by LCC18 treatment.

Figure 3C:
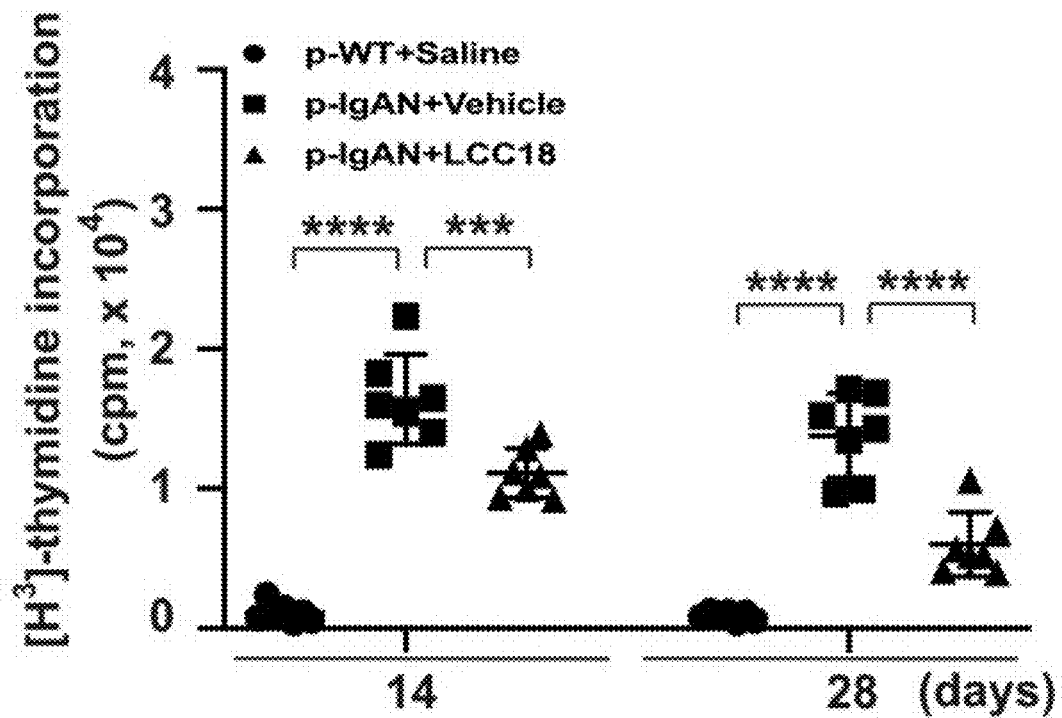
Figure 3D:
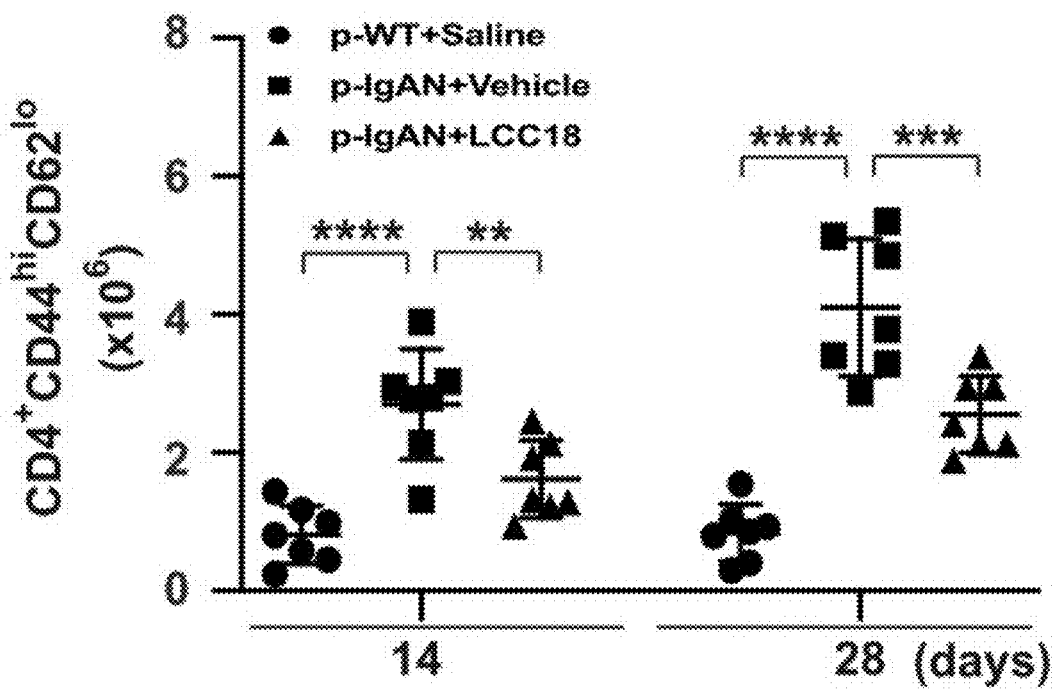
Figure 3E:
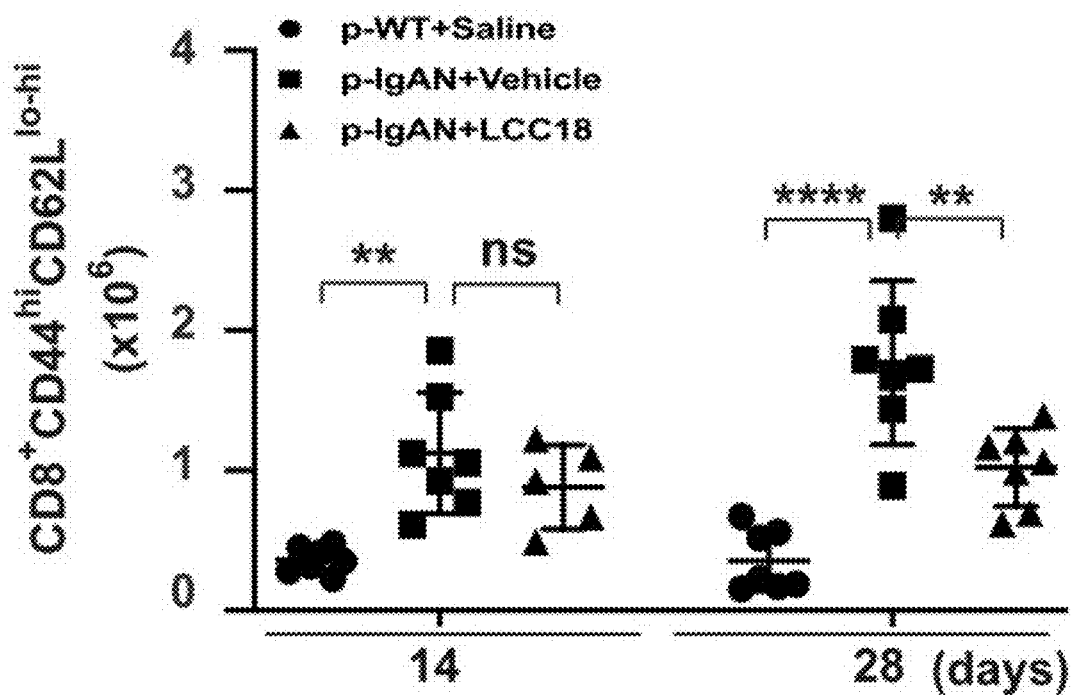
Figure 3F:
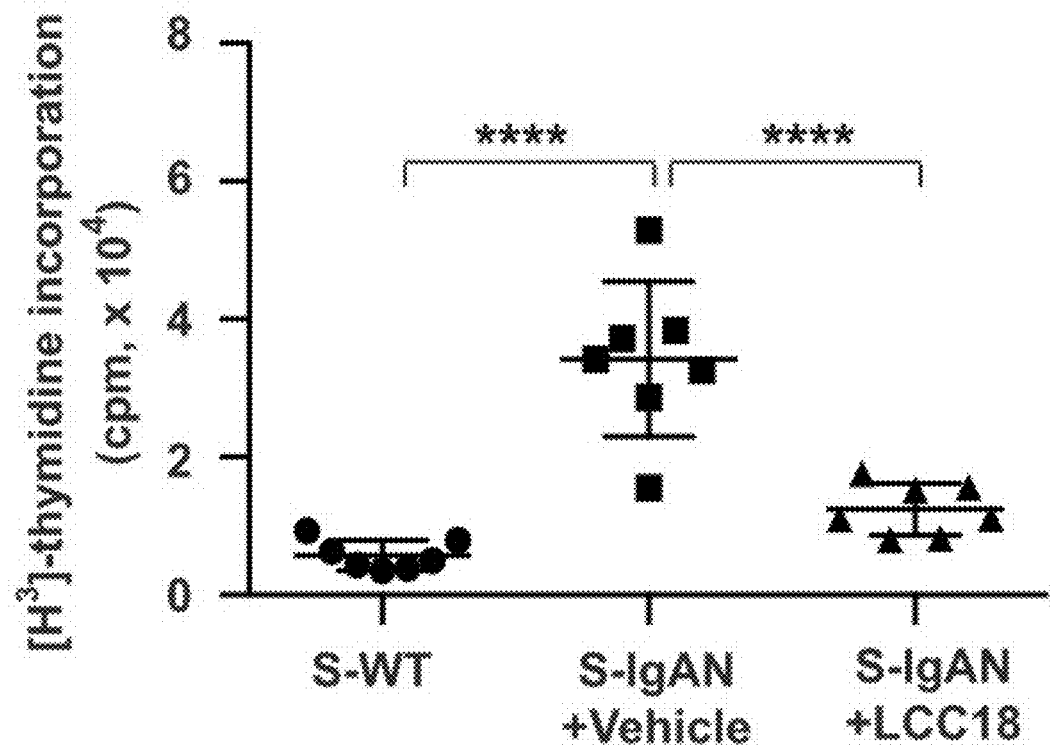

Moreover, compared with S-IgAN+Vehicle and P-IgAN+Vehicle mice, S-IgAN+LCC18 and p-IgA+LCC18 mice showed significantly decreased T cell proliferation, as demonstrated by [$^3$H] thymidine uptake (FIG. 3C and FIG. 3F).

Figure 3G:
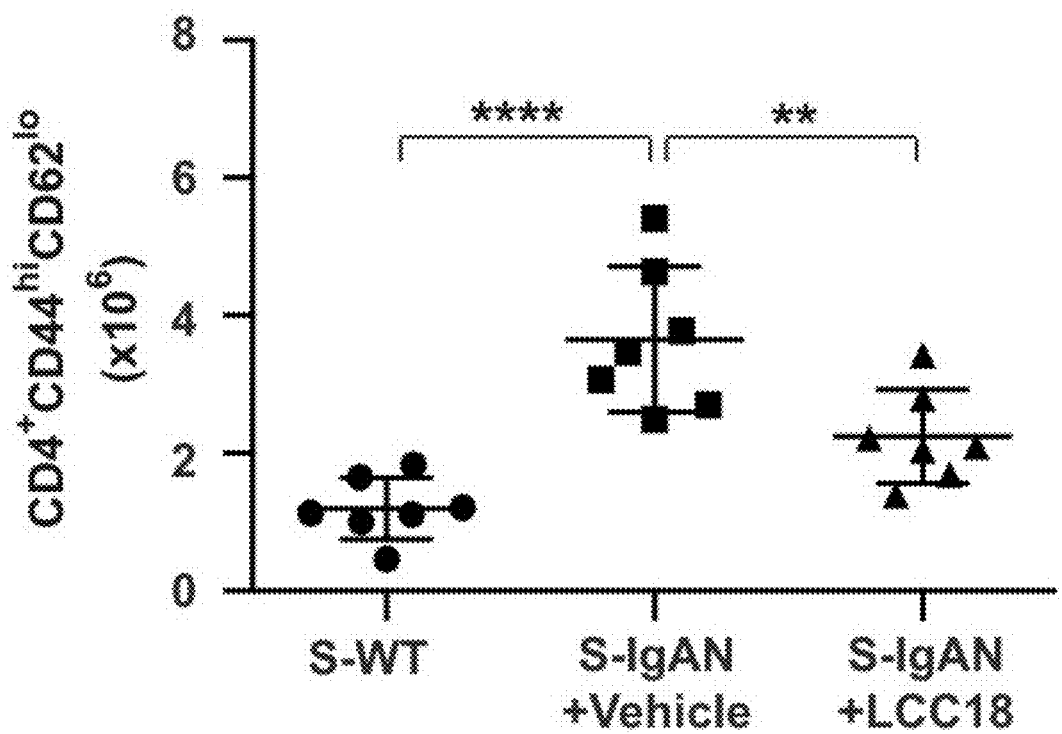
Figure 3H:
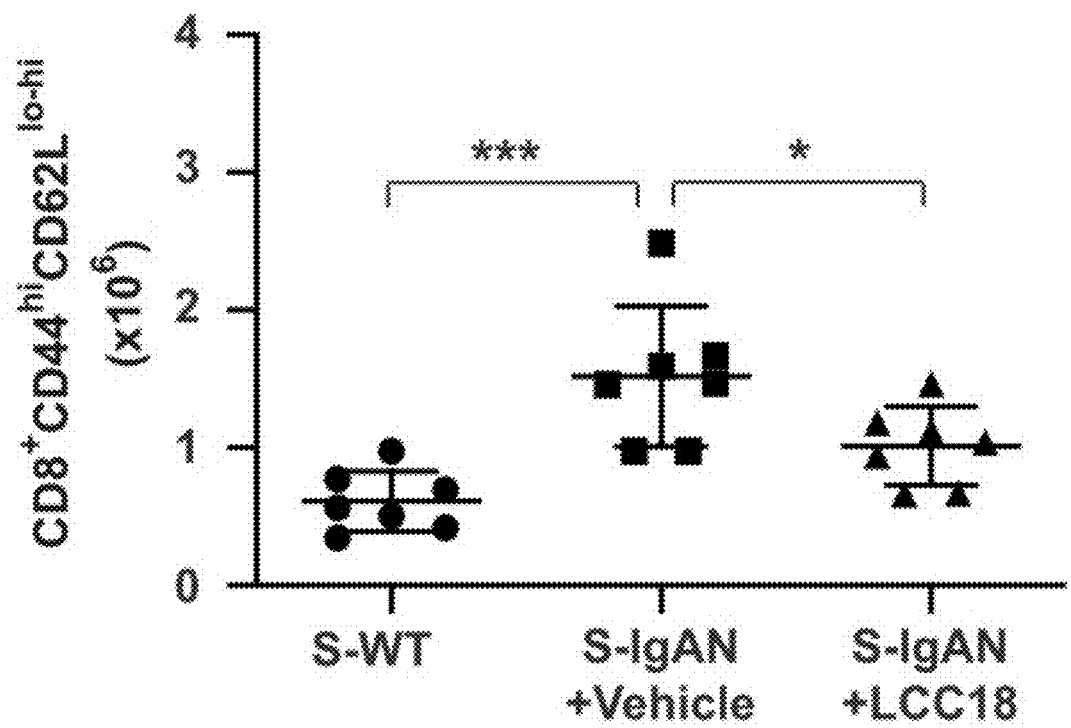

Although P-IgAN+Vehicle mice exhibited a higher total number of $CD4^+CD44^{hi}CD62L^{lo}$ and $CD8^+CD44^{hi}CD62L^{lo-hi}$ memory T cells in the spleen than P-WT+Saline and S-WT mice (FIG. 3D and FIG. 3E), this increase was inhibited in P-IgAN+LCC18 mice. In parallel, increases in splenic cells numbers of $CD4^+CD44^{hi}CD62L^{lo}$ and $CD8^+CD44^{hi}CD62L^{lo-hi}$ memory T cells in S-IgAN+Vehicle mice were also inhibited in S-IgAN+LCC18 mice (FIG. 3G and FIG. 3H). Collectively, these examples demonstrated that LCC18 is involved in negatively regulating DCs and T cell functions.

Example 4

LCC18 Improves Renal Function and Reduces Albuminuria and Renal Pathology in Accelerated, Severe Lupus Nephritis (ASLN) Model To establish ASLN model mice, eight-week-old female NZB/WF1 mice (prior to autoantibody production) were given LPS (Sigma, MO, USA) (0.8 mg/kg body weight) twice a week by intraperitoneal injection. Seven days after the first injection of LPS, seven mice each received either LCC18 (10 mg/kg body weight) or vehicle (polyethylene glycol 400) (Sigma) daily via intraperitoneal injections.

Another group of age-matched female NZB/WF1 mice were injected with saline and served as normal controls. All mice were sacrificed 5 weeks after induction of the disease. All animal experiments were performed in compliance with the NIH Guidelines for the Care and Use of Laboratory Animals with approval of the Institutional Animal Care and Use Committee of The National Defense Medical Center, Taipei, Taiwan.

Next, an ASLN model in NZB/W F1 mice, which mimics acute onset of severe LN in human, was validated potential therapeutic effects of LCC18 in the present invention. LN was induced in these mice by intermittent LPS injections to simulate SLE patients following bacterial or viral infections believed to act as environmental triggers. LCC18 was administered daily after the onset of the renal condition in ASLN mice (ASLN+LCC18 mice), while ASLN mice that received vehicle only (ASLN+Vehicle mice) were used as disease control mice.

Urine samples were collected for albuminuria assessment using the ratio of urine albumin/urine creatinine (Cr). Serum blood urea nitrogen (BUN) and Cr levels were determined.

Figure 4A:
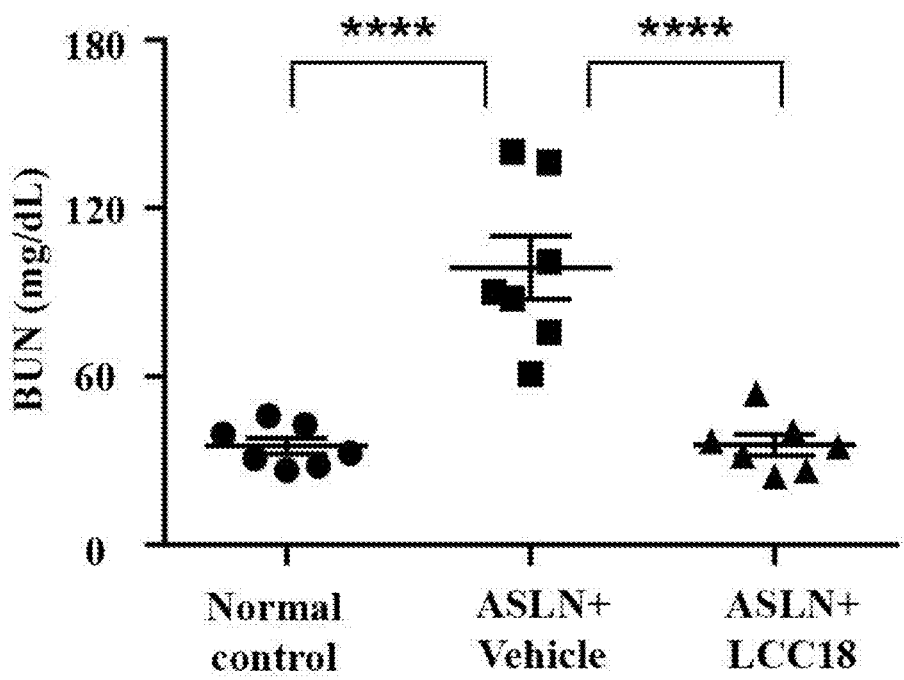
FIG. 4A-4G illustrate renal function, albuminuria, pathology, and IgG anti-dsDNA in ASLN mice. Serum levels of BUN (FIG. 4A) and Cr (FIG. 4B). Urine albumin levels (FIG. 4C). Renal pathology, H&E staining (FIG. 4D). Scale bars=50 Original magnification 400×. Scoring for renal pathology (FIG. 4E and FIG. 4F). Serum levels of IgG anti-dsDNA autoantibody (FIG. 4G). Data are presented as means±SEM for seven mice per group. ASLN, accelerated, severe lupus nephritis. BUN, blood urea nitrogen; Cr, creatinine. *$p<0.005$, **$p<0.001$, #Not detectable. Data of FIG. 4A-4C, 4E-4G were analyzed using ANOVA (with Dunnett's multiple comparisons test).
Figure 4B:
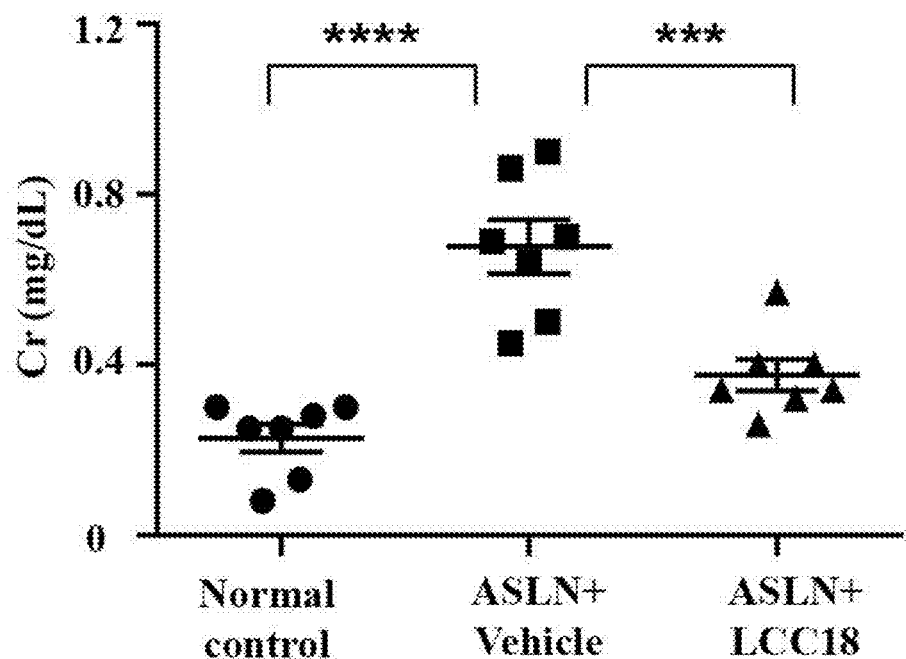
Figure 4C:
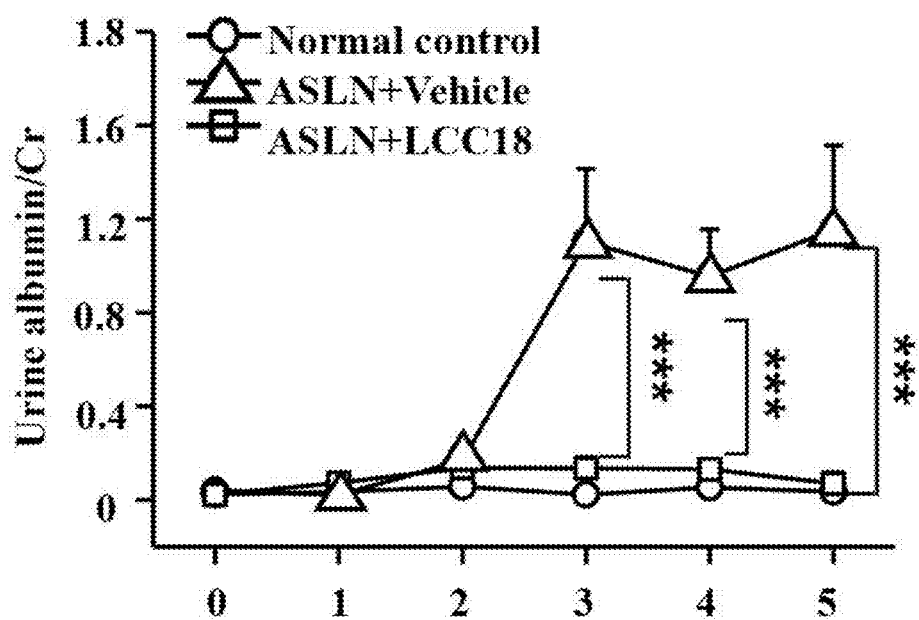

In one embodiment, elevated serum levels of BUN and Cr were seen in ASLN+Vehicle mice, but these effects were significantly inhibited in ASLN+LCC18 mice (FIG. 4A and FIG. 4B). In parallel, ASLN+LCC18 mice exhibited greatly reduced albuminuria, compared with ASLN+Vehicle mice, which manifested overt albuminuria in comparison with saline control mice (FIG. 4C).

Figure 4D:
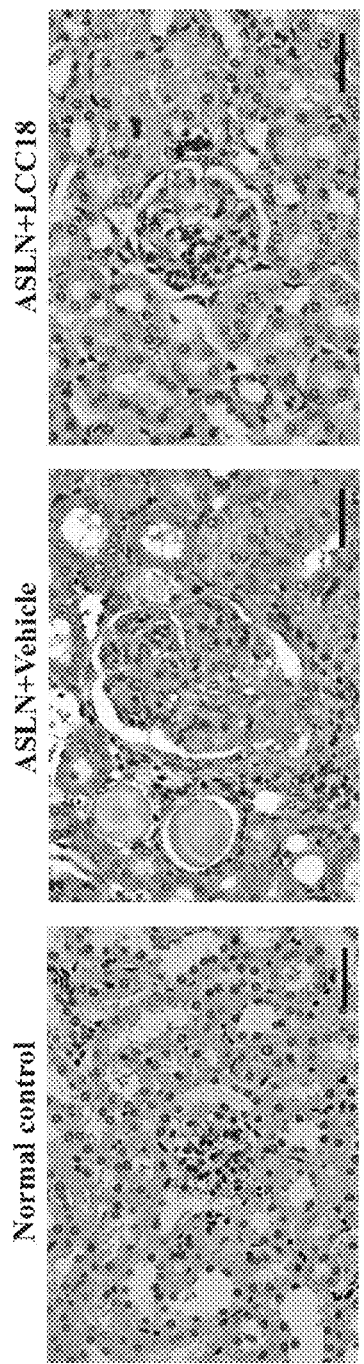
Figure 4E:
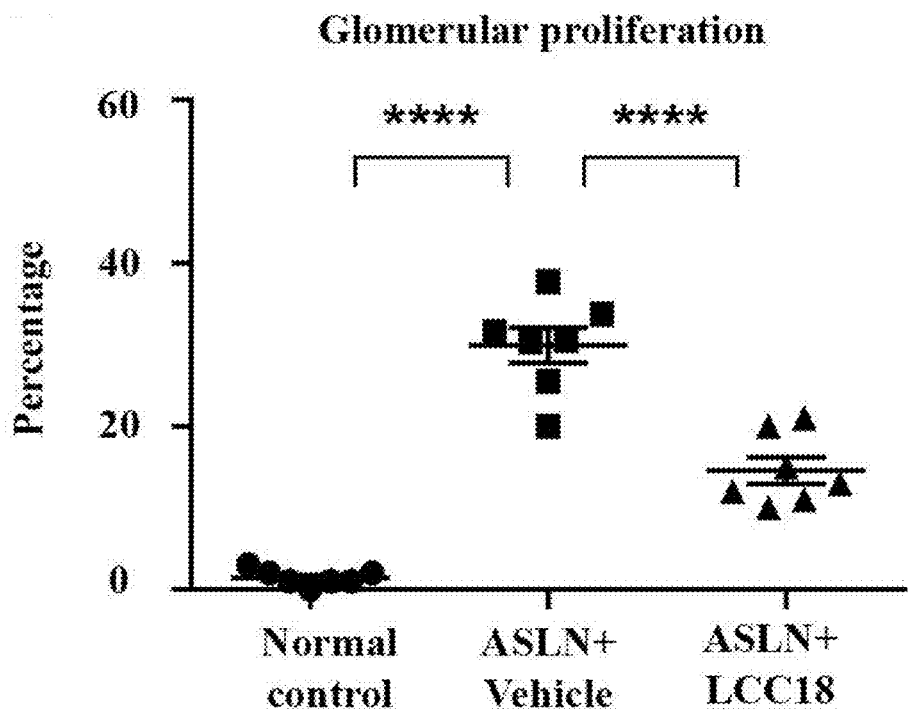
Figure 4F:
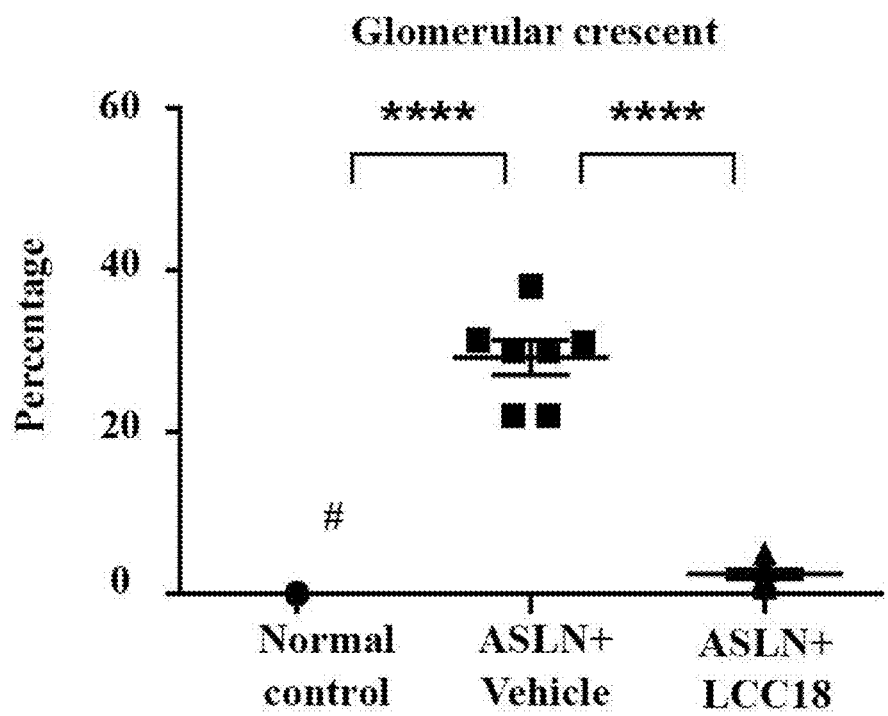

On the other hand, renal tissues were fixed in formalin buffer and paraffin-embedded and stained with hematoxylin and eosin (H&E). Scoring of renal pathology was evaluated. In another embodiment, while ASLN+Vehicle mice developed serious pathological changes, including intrinsic cell proliferation, and crescent formation, these effects were significantly inhibited in ASLN+LCC18 mice (FIG. 4D-4F).

Example 5

LCC18 Treatment Reduces Levels of Anti-dsDNA in Sera for ASLN Model

Levels of anti-dsDNA antibody (Alpha Diagnostic International, TX, USA) were measured using commercial ELISA kits.

Figure 4G:
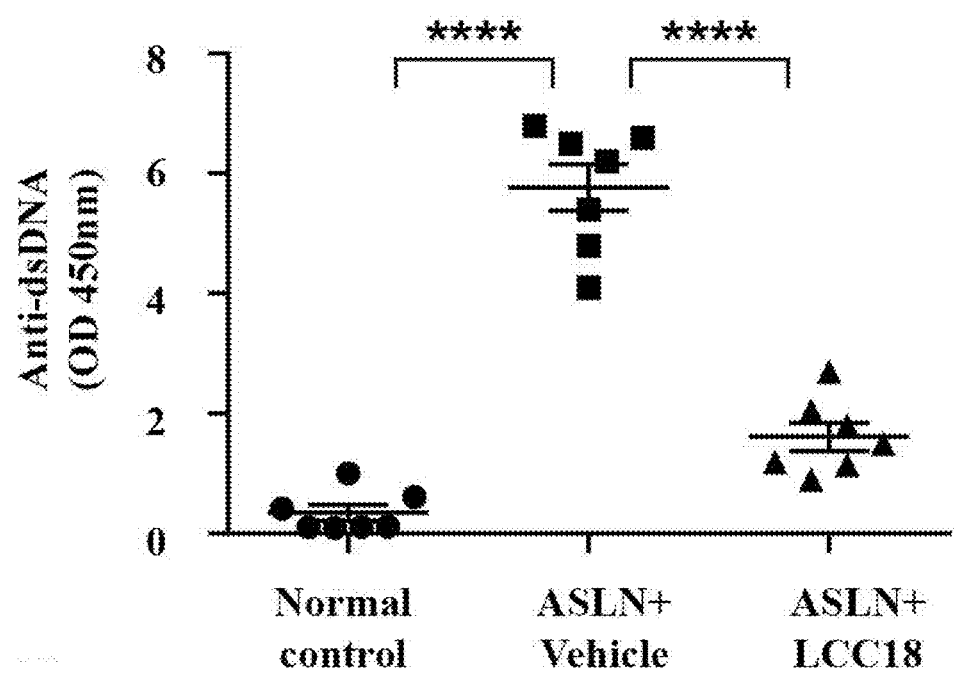

Greatly reduced serum anti-dsDNA levels were observed in ASLN+LCC18 mice, compared with increased serum anti-dsDNA levels in ASLN+Vehicle mice in relation to saline control mice (FIG. 4G).

Example 6

LCC18 Treatment Regulates Systemic T Cell Functions for ASLN Model

Figure 5A:
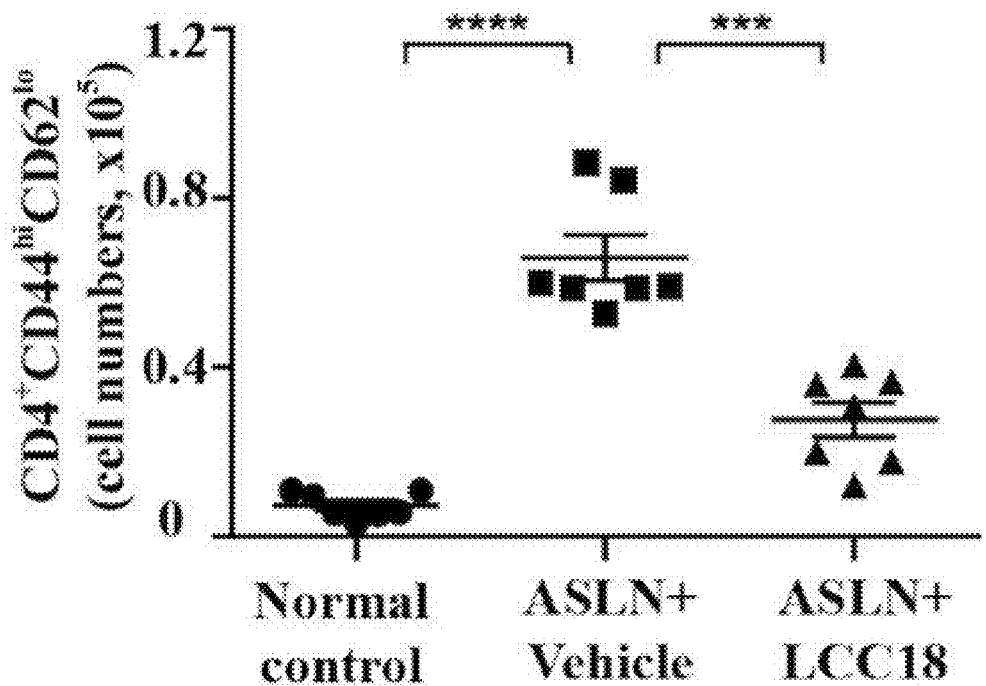
FIG. 5A-5D illustrate flow cytometry in ASLN mice and OT-II antigen-specific T cell proliferation analysis. Analysis of $CD4^+CD44^{hi}CD62L^{lo}$ T memory cells (FIG. 5A), $CD8^+CD44^{hi}CD62L^{lo-hi}$ T memory cells (FIG. 5B), $CD4^+CD25^+Foxp3^+$ Treg cells (FIG. 5C) in splenocytes by using flow cytometry.
Figure 5B:
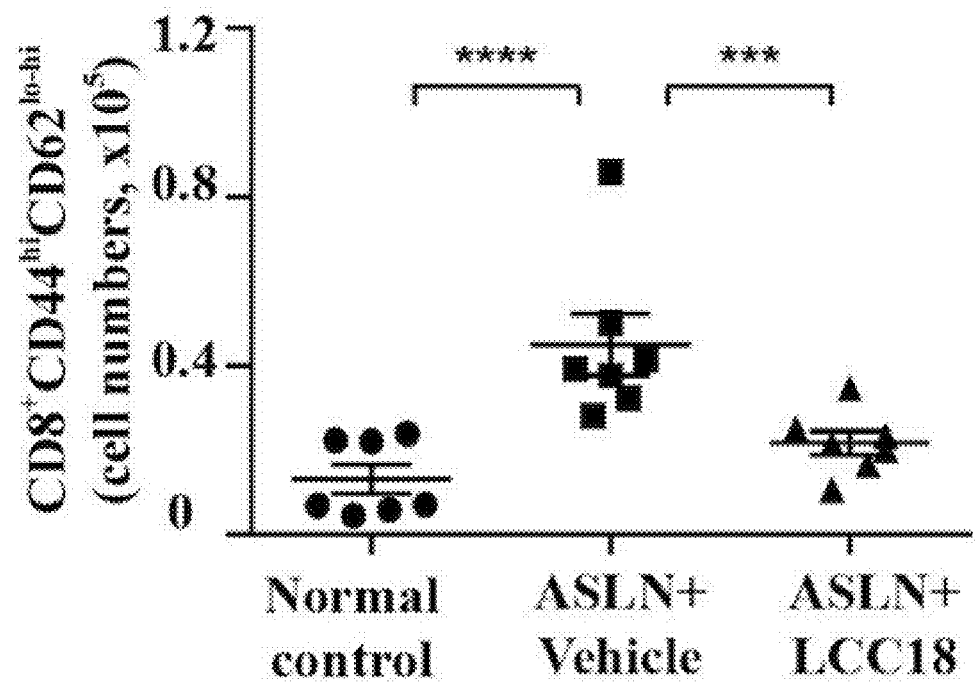
Figure 5C:
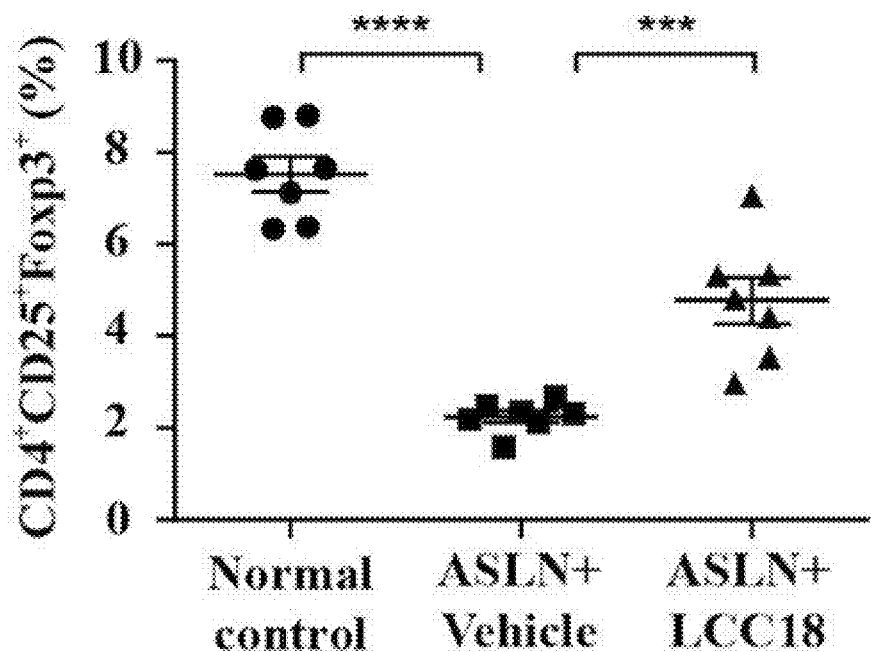
Figure 5D:
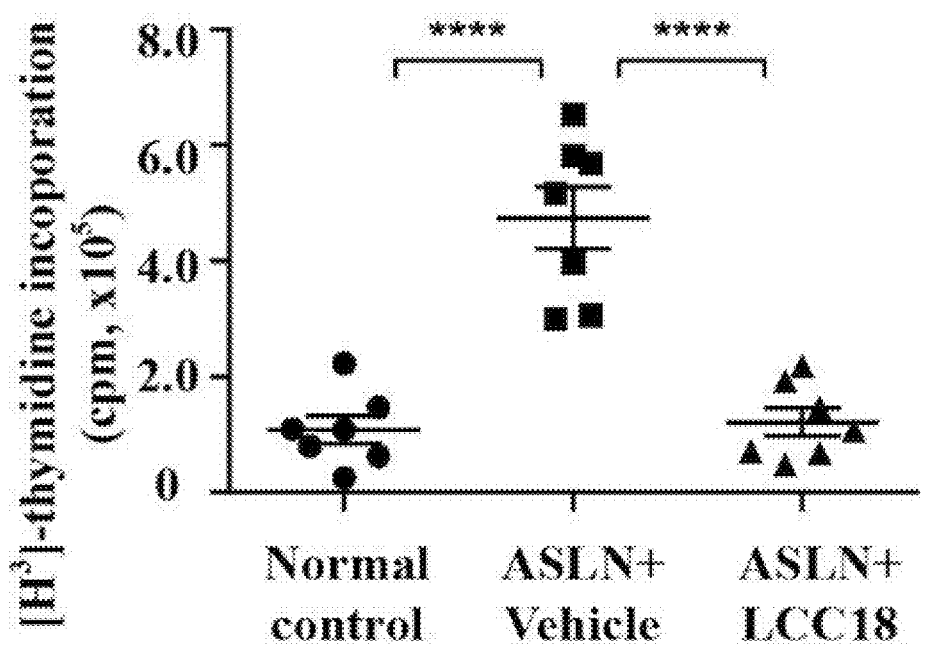

In one embodiment, LCC18 treatment inhibited $CD4^+$ and $CD8^+$ T cells (FIG. 5A and FIG. 5B), but enhanced Treg cell differentiation (FIG. 5C) and T cell proliferation (FIG. 5D) in splenocytes from ASLN+LCC18 mice. These results suggest that differential regulation of T cell activation and Treg differentiation may be involved in the therapeutic effect of LCC18 in this ASLN mouse model.

Example 7

LCC18 Treatment Reduces Renal ROS for ASLN Model

Figure 6:
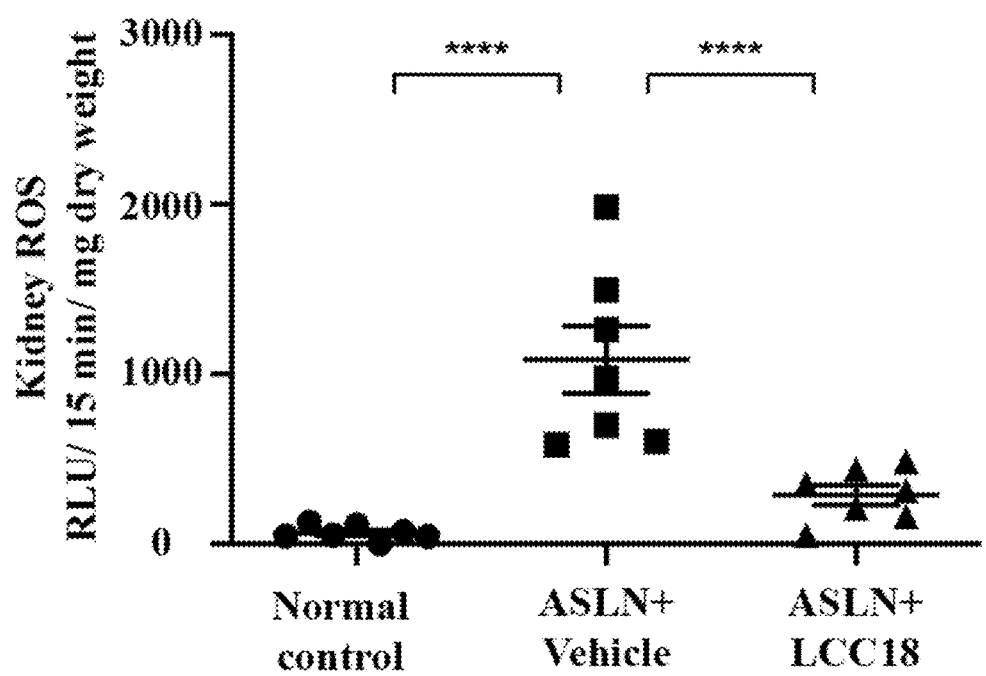
FIG. 6 illustrate renal ROS production-in ASLN mice. Data are presented as means±SEM with seven mice per group. ROS, reactive oxygen species; ASLN, accelerated, severe lupus nephritis. $p<0.01$, *$p<0.005$, ****$p<0.001$. Data of FIG. 6 were analyzed using ANOVA (with Dunnett's multiple comparisons test).
Figure 7A:
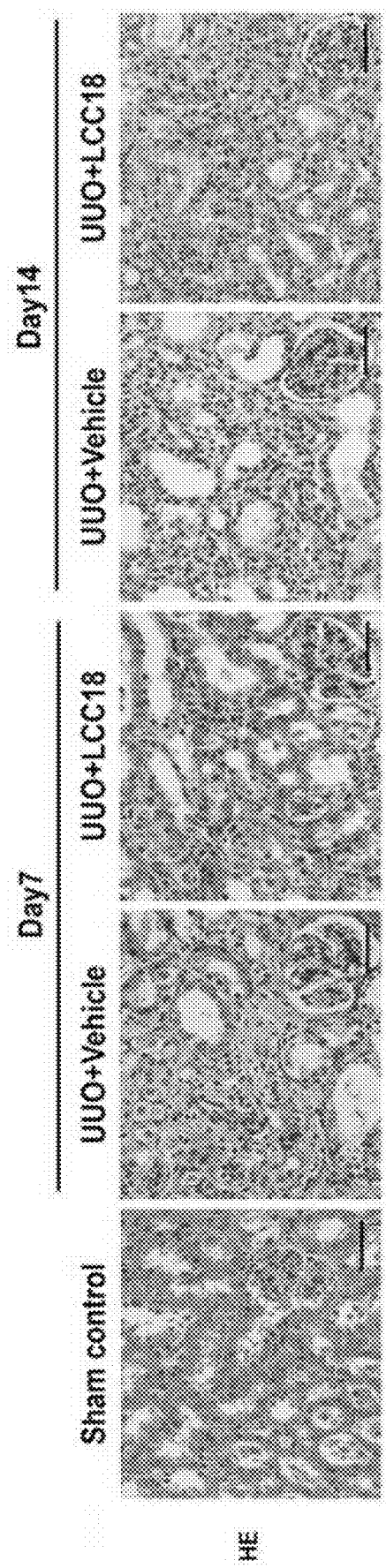
FIG. 7A-7D show that renal histopathological evaluation using hematoxylin and eosin (H&E) (FIGS. 7A-7B) and Masson's trichrome staining (FIG. 8C-8D). Scoring of TILs (FIG. 7B) and renal tubulointerstitial fibrotic area (FIG. 7D). *$p<0.05$, *$p<0.005$, **$p<0.001$. ns, no significant difference. Data of FIG. 7B and FIG. 7D were analyzed using ANOVA (with Dunnett's multiple comparisons test).
Figure 7B:
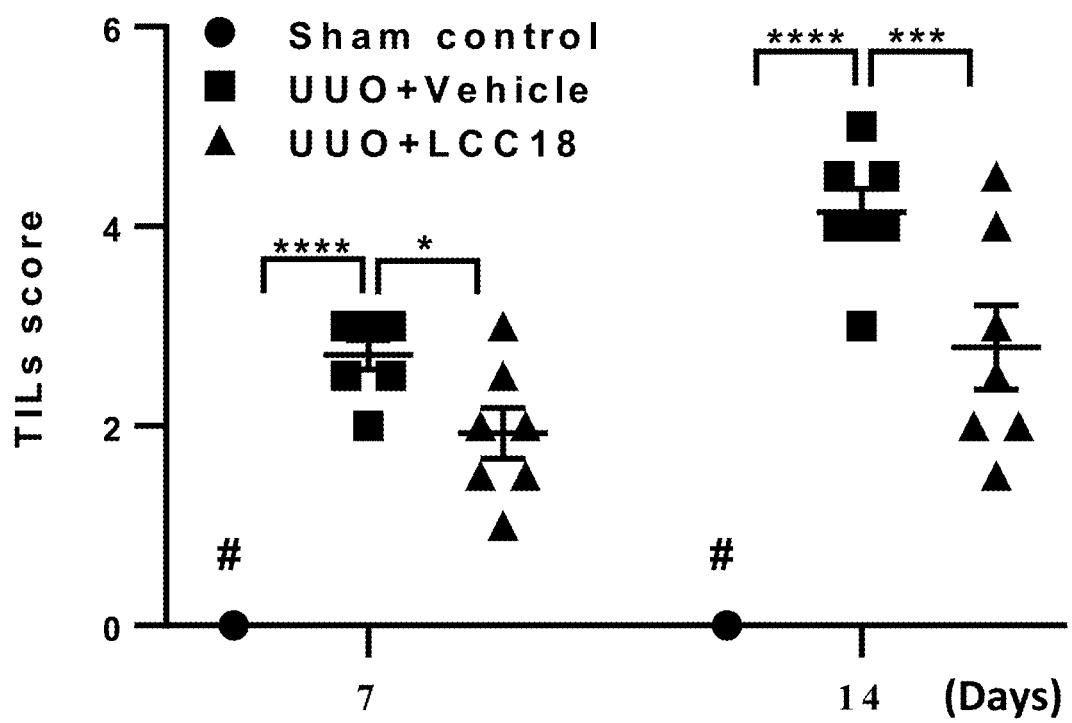
Figure 7C:
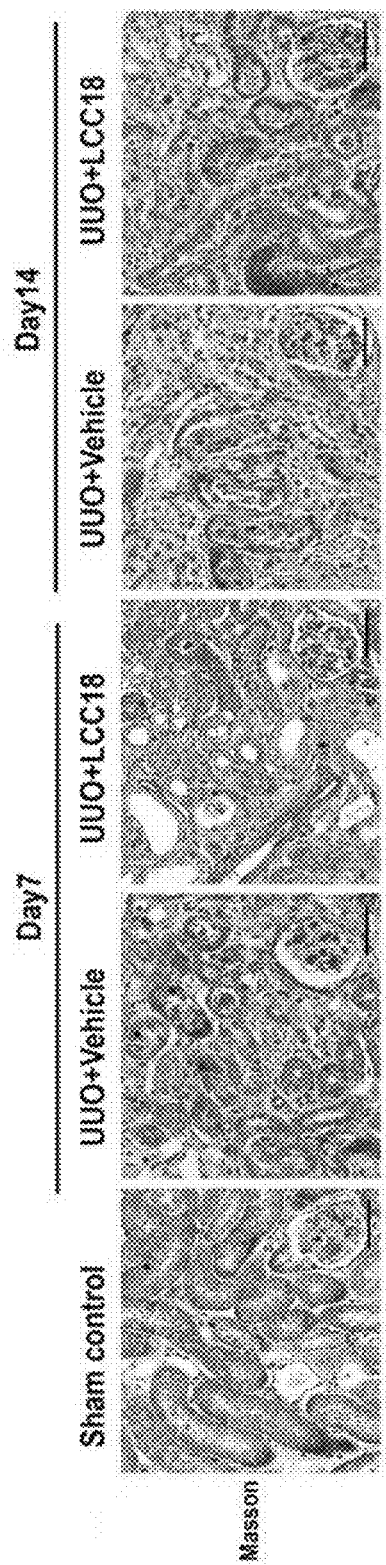
Figure 7D:
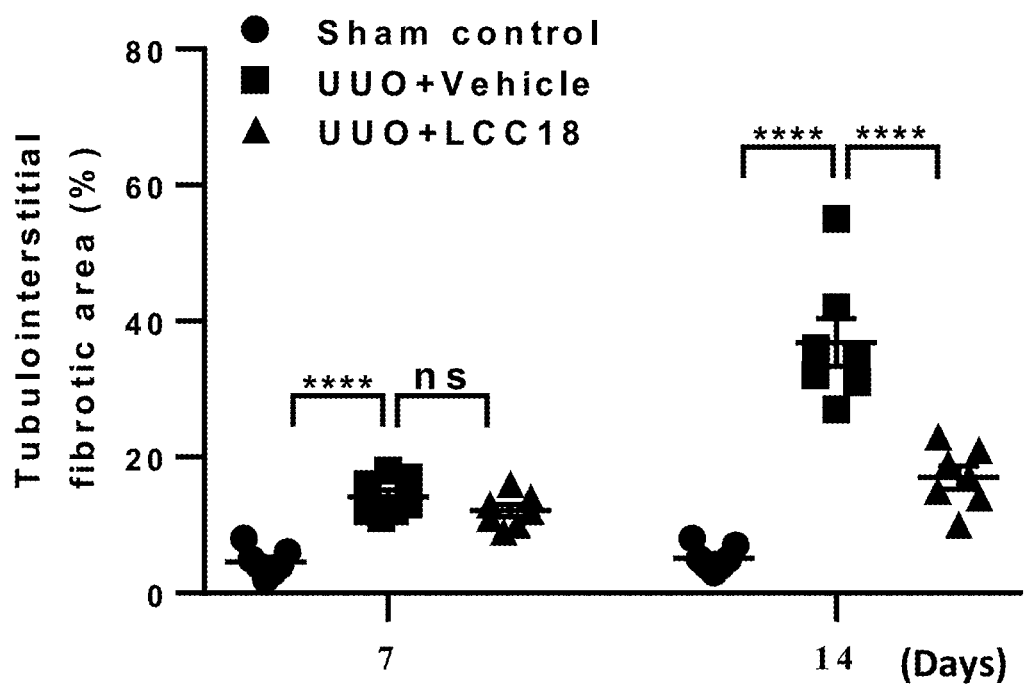

Reactive oxygen species (ROS) levels in renal tissues were measured by a lucigenin-enhanced chemiluminescence assay. ASLN+LCC18 mice exhibited significantly reduced renal levels of ROS, compared with ASLN+Vehicle mice (FIG. 6).

Example 8

LCC18 Improves Renal Pathology in UUO Mice Mimicking Renal Tubulointerstitial Lesions (TILs) Via Histopathology To establish Unilateral ureteral obstruction (UUO) model for mimicking renal tubulointerstitial lesions (TILs), the mice (8-12 weeks of age) were anesthetized followed by a lateral incision on the back of the mouse. After the left ureter was exposed, it was tied with a silk suture at two points and permanently ligated. Sham-operated mice, which underwent an identical procedure but without ureteric ligation, were used as sham control. After 7 or 14 days, the mice were euthanized, and then, renal tissues, pelvis urine, and renal draining lymph nodes were collected.

LCC18 (10 mg/kg body weight) was administered intraperitoneally 1 day before (preventive group) or 3 days after (therapeutic group) the induction of UUO, or 1 day after the ligation of renal vessels in this model. Diseased mice that received only polyethylene glycol 400 (PEG 400) (Sigma-Aldrich, St. Louis, MO, USA) daily via intraperitoneal injections were used as the vehicle control group. All animal experiments were performed with the approval of the Institutional Animal Care and Use Committee of the National Defense Medical Center, Taiwan, in compliance with the NIH Guide for the Care and Use of Laboratory Animals.

Renal tissues were fixed in 10% buffered formalin, embedded in paraffin, and 3-μm thick sections were cut for haematoxylin and eosin (H&E) staining. Fifty glomeruli were examined in at least two renal tissue sections per slide by light microscopy at ×400 magnification. The percentage of glomeruli showing proliferation, or glomerular sclerosis was determined.

The quantitative analysis of the data obtained from hematoxylin and eosin (H&E) and Masson's trichrome staining of renal histopathological evaluation was used by quantitative imaging software (Pax-it; Paxcam, Villa Park, IL). As shown in FIG. 7A-7D, while Vehicle+UUO mice exhibited renal fibrotic changes on both days 7 and 14, these findings were greatly improved in UUO+LCC18 mice at these time points.

Example 9

LCC18 Improve Renal Fibrosis in UUO Mice

Further, in another embodiment, formalin-fixed and paraffin-embedded renal sections were incubated with primary antibodies followed by biotinylated secondary antibodies and avidin-biotin-peroxidase complex (Dako) for IHC staining.

Figure 8:
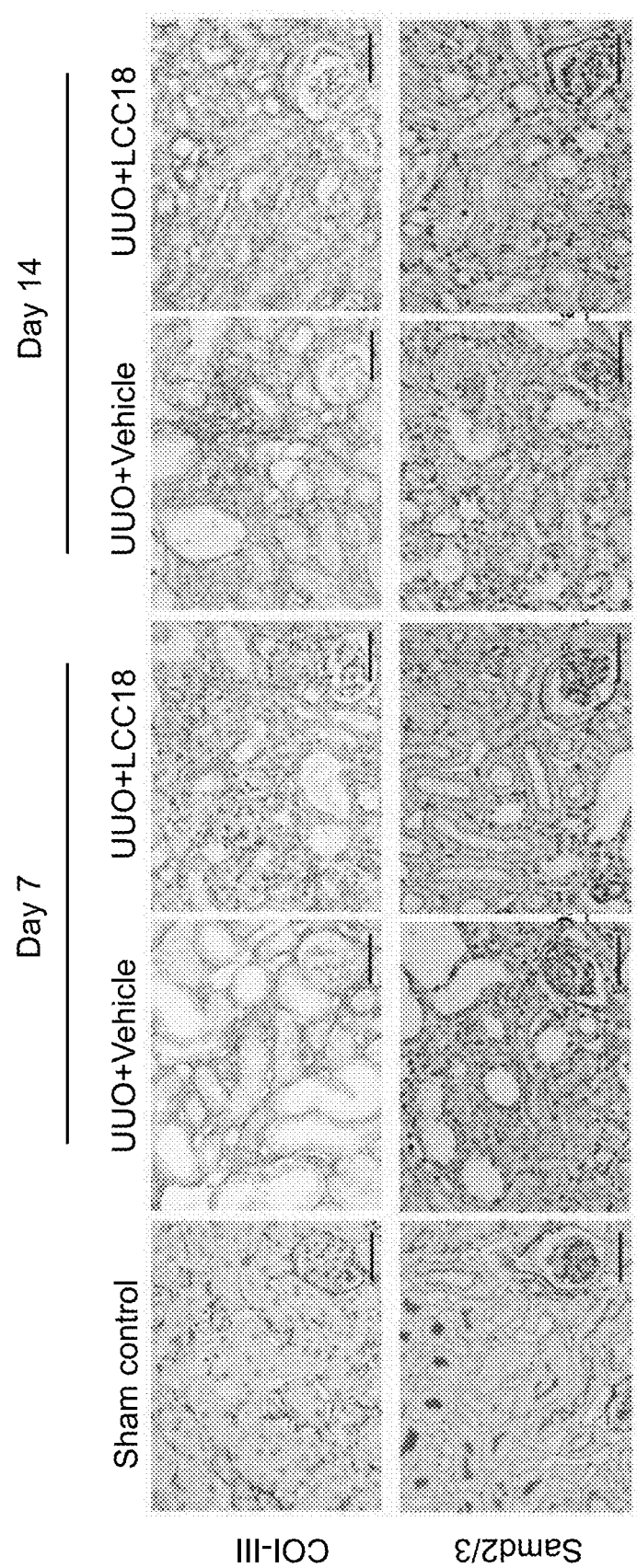
FIG. 8 shows that Col-III and Samd2/3 in the kidney by IHC.

Please refer FIG. 8, IHC shows that increased renal expression of Col-III, and p-Smad2/3 was identified in UUO+Vehicle mice compared with sham control mice on days 7 and 14, but this effect was inhibited in UUO+LCC18 mice.

In summary, the LCC18 attenuates glomerular cell proliferation about 15~35%, attenuates sclerosis and fibrosis, attenuates crescent formation about 40~90%, attenuates fibrinoid necrosis about 40~90% in a kidney of the CKDs' subject.

Further, the LCC18 can regulate renal function and albuminuria, downregulate serum levels of blood urea nitrogen (serum levels of BUN) about 50~60%, serum levels of creatinine (serum levels of Cr) about 30~40% and serum levels of IgG anti-dsDNA about 60~70% of the CKDs' subject.

The foregoing detailed description and examples have been provided for clarity of understanding only. No unnecessary limitations are to be understood therefrom. The invention is not limited to the exact details shown and described; many variations will be apparent to one skilled in the art and are intended to be included within the invention defined by the claims.

What is claimed is:

1. A method of ameliorating a renal fibrosis or treating a renal fibrosis in a subject in need thereof, comprising administering an effective amount of 6-(2,4-difluorophenyl)-3-(3-(trifluoromethyl)phenyl)-2H-benzo[e][1,3]oxazine-2,4(3H)-dione to the subject, wherein the 6-(2,4-difluorophenyl)-3-(3-(trifluoromethyl)phenyl)-2H-benzo[e][1,3]oxazine-2,4(3H)-dione attenuates renal fibrosis of the subject, and the subject suffers from renal tubulointerstitial lesions (TILs).

2. A method of ameliorating a renal fibrosis or treating a renal fibrosis in a subject in need thereof, comprising administering an effective amount of 6-(2,4-difluorophenyl)-3-(3-(trifluoromethyl)phenyl)-2H-benzo[e][1,3]oxazine-2,4(3H)-dione to the subject, wherein the 6-(2,4-difluorophenyl)-3-(3-(trifluoromethyl)phenyl)-2H-benzo[e][1,3]oxazine-2,4(3H)-dione attenuates renal fibrosis of the subject, and the subject suffers from IgA nephropathy (IgAN).

3. A method of ameliorating a renal fibrosis or treating a renal fibrosis in a subject in need thereof, comprising administering an effective amount of 6-(2,4-difluorophenyl)-3-(3-(trifluoromethyl)phenyl)-2H-benzo[e][1,3]oxazine-2,4(3H)-dione to the subject, wherein the 6-(2,4-difluorophenyl)-3-(3-(trifluoromethyl)phenyl)-2H-benzo[e][1,3]oxazine-2,4(3H)-dione attenuates renal fibrosis of the subject, and the subject suffers from lupus nephritis (LN).

4. The method according to claim 3, wherein the 6-(2,4-difluorophenyl)-3-(3-(trifluoromethyl)phenyl)-2H-benzo[e][1,3]oxazine-2,4(3H)-dione can downregulate serum levels of IgG anti-dsDNA about 60~70% of the subject.

5. The method according to claim 1, wherein the 6-(2,4-difluorophenyl)-3-(3-(trifluoromethyl)phenyl)-2H-benzo[e][1,3]oxazine-2,4(3H)-dione can downregulate serum levels of blood urea nitrogen about 50~60% in the subject.

6. The method according to claim 1, wherein the 6-(2,4-difluorophenyl)-3-(3-(trifluoromethyl)phenyl)-2H-benzo[e][1,3]oxazine-2,4(3H)-dione can downregulate serum levels of creatinine about 30~40% in the subject.

7. The method according to claim 1, wherein the 6-(2,4-difluorophenyl)-3-(3-(trifluoromethyl)phenyl)-2H-benzo[e][1,3]oxazine-2,4(3H)-dione can attenuate sclerosis and fibrosis in a kidney of the subject.

8. The method according to claim 1, wherein the 6-(2,4-difluorophenyl)-3-(3-(trifluoromethyl)phenyl)-2H-benzo[e][1,3]oxazine-2,4(3H)-dione can attenuate crescent formation about 40~90% in a kidney of the subject.

9. The method according to claim 1, wherein the 6-(2,4-difluorophenyl)-3-(3-(trifluoromethyl)phenyl)-2H-benzo[e][1,3]oxazine-2,4(3H)-dione can attenuate glomerular cell proliferation about 15~35% in a kidney of the subject.

* * * * *